US012603319B2

(12) United States Patent
Kim

(10) Patent No.: US 12,603,319 B2
(45) **Date of Patent: \*Apr. 14, 2026**

(54) SELF-CHARGING ELECTROCHEMICAL CELLS

(71) Applicant: WATTRII, INC., Austin, TX (US)

(72) Inventor: Jangwoo Kim, San Jose, CA (US)

(73) Assignee: WATTRII, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,949

(22) Filed: May 24, 2023

(65) Prior Publication Data

US 2024/0030477 A1 Jan. 25, 2024

Related U.S. Application Data

(63) Continuation of application No. 17/382,254, filed on Jul. 21, 2021, now Pat. No. 11,699,802.

(51) Int. Cl.
| | |
|---|---|
| *H01M 8/18* | (2006.01) |
| *H01M 4/62* | (2006.01) |
| *H01M 4/66* | (2006.01) |

(52) U.S. Cl.
CPC ........... *H01M 8/188* (2013.01); *H01M 4/625* (2013.01); *H01M 4/661* (2013.01)

(58) Field of Classification Search
None
See application file for complete search history.

(56) References Cited

U.S. PATENT DOCUMENTS

| | | | |
|---|---|---|---|
| 2009/0061315 A1* | 3/2009 | Nakano | H01M 4/0404 |
| | | | 429/218.1 |
| 2012/0115048 A1* | 5/2012 | Roev | B82Y 30/00 |
| | | | 977/773 |
| 2015/0125763 A1 | 5/2015 | Zheng | |
| 2016/0344035 A1* | 11/2016 | Zhamu | H01M 4/366 |
| 2016/0380273 A1* | 12/2016 | Wu | H01M 4/8605 |
| | | | 429/405 |
| 2021/0057795 A1 | 2/2021 | Bi | |

FOREIGN PATENT DOCUMENTS

WO WO-2013077863 A1 * 5/2013 ............ H01M 12/08

OTHER PUBLICATIONS

J. Christensen, P. Albertus, R. S. Sanchez-Carrera, T. Lohmann, B. Kozinsky, R. Liedtke, J. Ahmed, A. Kojic. A Critical Review of Li/Air Batteries, J. Electrochem. Soc., 159 (2) R1-R30 (2012). (Year: 2012).*

* cited by examiner

*Primary Examiner* — Carlos Barcena
(74) *Attorney, Agent, or Firm* — Raven Patents, LLC; Anton E. Skaugset

(57) ABSTRACT

Self-charging electrochemical cells, including self-charging batteries that incorporate such self-charging electrochemical cells, the electrochemical cells including a cathode including a cathode active material, an electrolyte including a solvent and a salt dissolved in the solvent, the electrolyte being in contact with the cathode, where the cathode active material is transformed into a discharge product during or after a discharge of the self-charging electrochemical cell and a solubility of the cathode active material in the electrolyte is less than a solubility of the discharge product in the electrolyte.

20 Claims, 9 Drawing Sheets

SELF-CHARGING ELECTROCHEMICAL CELLS

CROSS-REFERENCE TO RELATED APPLICATIONS

This application is a continuation under 35 USC § 120 of U.S. patent application Ser. No. 17/382,254, filed Jul. 21, 2021, for SELF-CHARGING ELECTROCHEMICAL CELLS, which is hereby incorporated by reference for all purposes.

TECHNICAL FIELD

This disclosure relates generally to electrochemical cells, and more specifically to electrochemical cells that are self-charging.

BACKGROUND

Batteries, or electrochemical cells, are ubiquitous in modern technology, being used in a wide range of applications from small electrochemical systems for industrial and medical devices, to larger electrochemical systems for electric vehicles and grid energy storage systems.

Perhaps the most well-known and widely-used battery technology at the present are lithium-ion batteries, which generally include one or more electrochemical cells, each electrochemical cell including two electrodes (e.g., positive, negative), a typically liquid electrolyte, and often a separator between the electrodes. Although typical lithium-ion batteries generally work well in a variety of applications, there exists a demand for batteries exhibiting higher energy densities, increased charging rates, lower cost, and reduced safety hazards, principally reduced flammability.

Self-charging batteries have been introduced in order to integrate energy-harvesting devices and batteries in a single unit. Energy-harvesting devices can include solar cells, wind turbines, piezoelectric or electromagnetic transductions, and triboelectric generators. The self-charging batteries used for energy-harvesting device are, however, dependent on the availability of an outside energy source.

What is needed are improved self-charging electrochemical cells, and improved components of self-charging electrochemical cells, and in particular self-charging electrochemical cells that are more sustainable.

SUMMARY

The self-charging electrochemical cells of the present disclosure can provide additional energy beyond the theoretical capacity of their component active materials that the cell can store. The disclosed electrochemical cells can additionally achieve a semi-perpetual or a perpetual mode of providing and generating the energy at the same time.

In one example, the present disclosure provides electrochemical cells having a cathode that includes a cathode active material, an electrolyte including a solvent and a salt dissolved in the solvent, where the electrolyte is in contact with the cathode. The cathode active material of the electrochemical cell is transformed into a discharge product during or after a discharge of the electrochemical cell, and the solubility of the cathode active material in the electrolyte is less than the solubility of the discharge product in the electrolyte.

The disclosed features, functions, and advantages of the disclosed electrochemical cells may be achieved independently in various embodiments of the present disclosure, or may be combined in yet other embodiments, further details of which can be seen with reference to the following description and drawings.

BRIEF DESCRIPTION OF THE DRAWINGS

The drawings are not necessarily drawn to scale. The dimensions of some of the elements in the figures may be exaggerated relative to other elements to help improve understanding of illustrated embodiments of the present disclosure.

DETAILED DESCRIPTION

Figure 1:
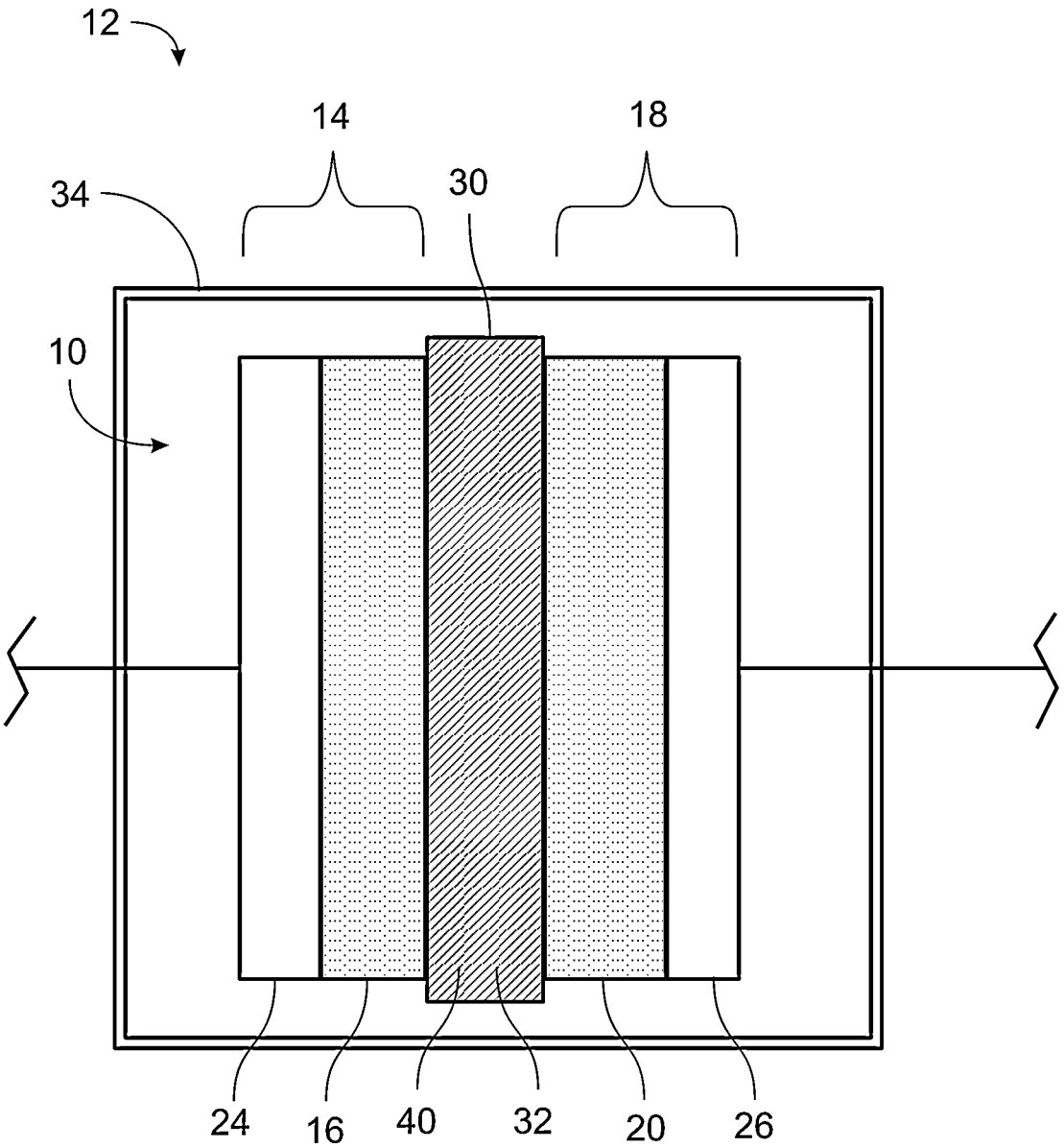
FIG. 1 is a schematic illustration of an exemplary self-charging electrochemical cell according to the present disclosure.

The following definitions apply herein, unless otherwise indicated.

It should be appreciated that while the descriptions of various embodiments in the disclosure are written in terms of describing a single electrochemical cell, similar principles may be applied to an assembly that includes more than one self-charging electrochemical cells (such as, for example, electrochemical cell packs, and the like). Such multiple-cell assemblies should be understood to fall within the scope of the present disclosure.

"Self-charging battery" refers to a battery that includes a self-charging electrochemical cell, that is, an electrochemical cell as described in the present disclosure that does not utilize an external power source for charging.

"Redox reaction" refers to a type of chemical reaction in which the oxidation state of participating atoms, molecules, radicals, or ions are changed by gaining or losing electrons. Redox reactions are characterized by the actual or formal transfer of electrons between chemical species, most often with one species undergoing oxidation while another species undergoes reduction.

"Redox shuttle" refers to a battery material that is capable of reversible oxidative-reductive reactions at a certain potential on the surface of both the cathode and the anode. A redox shuttle is traditionally used as an electrolyte additive to provide overcharge protection and safe operation of lithium-ion batteries by forming a radical cation on the cathode where it is oxidized during charging, traveling to an anode where it is reduced and diffusing back to the cathode.

A "cathode" refers to an electrode of a battery cell that receives electrons from an external circuit and is reduced during discharging of the cell, and transfers electrons to an external circuit through oxidation during charging of the cell. A cathode can also be referred to as a positive electrode.

An "anode" refers to an electrode of a battery cell that transfers electrons to an external circuit through oxidation during discharging of the cell, and receives electrons from an external circuit and is reduced during charging of the cell. An anode can be referred to as a negative electrode.

"Electrode active material" refers to the portion or component of an electrode that participates in reactions by transporting ions through an electrolyte and/or electrons through an external circuit. An electrode active material can be a cathode active material or an anode active material.

"Current collector" refers to the component adjacent to an electrode configured to convey current from a fixed to a moving portion of the circuit of the electrochemical cell, or vice versa.

"Electrolyte" refers to a material that provides for ion transport within an electrochemical cell. An electrolyte acts as a conduit for ion transport through its interaction with an electrode. In particular, during charging of the electrochemical cell, the electrolyte can facilitate the movement of ions from the cathode to the anode, and upon discharge, facilitate the movement of ions from the anode to the cathode.

A "current collector" is a bridging component that collects electrical current generated at an electrode and provides a connection to the external circuit. The current collector is typically adjacent to the cathode or the anode. In some embodiments, the current collector includes an electrically-conductive material, such as a porous carbon material, for example carbon black, carbon nanotubes, carbon nanofibers, carbon dots, activated carbon, graphite, graphene, graphene oxide, reduced graphene oxide, and graphene nanoribbons.

As used herein, "room temperature" is any temperature within a range of air temperatures that most people prefer for indoor settings, and which feel comfortable when wearing typical indoor clothing. More specifically, room temperature includes temperatures from 15 to 25° C. (or 59 to 77° F.).

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" may be used to distinguish or identify various members of a group, or the like, and are not intended to show serial or numerical limitation.

Unless they relate to specific examples, all specifications regarding quantities and portions, particularly those for delimiting the invention, indicate a ±10% tolerance, for example: 11% means: from 9.9% to 12.1%. For terms such as "a solvent", the word "a" is not to be regarded as a numerical word but as an indefinite article or as a pronoun, unless the context indicates otherwise.

The term: "combination" or "combinations" means, unless otherwise stated, all types of combinations, starting from two of the relevant constituents, to a plurality or all of such constituents.

The present disclosure is directed to self-charging electrochemical cells, batteries that incorporate one or more self-charging electrochemical cells. An illustrative self-charging electrochemical cell 10 for a battery 12 is depicted semi-schematically in FIG. 1. Electrochemical cell 10 includes a cathode 14 that includes a cathode active material 16. Electrochemical cell 10 may further include an anode 18 that includes an anode active material 20.

Either of the cathode 14 or the anode 18, or both, may be associated with or coupled to a current collector that is in electrical contact with the associated electrode. The current collector associated with cathode 14 can be referred to as the cathode current collector 24, while the current collector associated with the anode can be referred to as the anode current collector 26.

The self-charging electrochemical cells 10 of the present disclosure include a cathode with a cathode active material 16 that is transformed into a discharge product 28 during or after discharge of electrochemical cell 10, and an electrolyte 30, where electrolyte 30 is in contact with cathode 14, and the solubility of cathode active material 16 in electrolyte 30 is less than the solubility of discharge product 28 in electrolyte 30.

Selected examples of the self-charging electrochemical cells of the present disclosure can provide additional energy beyond the theoretical capacity of the cell, based upon the active materials of the electrodes. The disclosed electrochemical cells may achieve a semi-perpetual or a perpetual mode of providing and generating energy simultaneously (and without violating the first law of thermodynamics) by adjustment of the electrochemical cell parameters, such as for example the size or the amount of the active material, the operating voltage or current, the operating temperature or pressure, the electrolyte composition, the type or the amount of electrocatalyst, and so on. The additional energy provided within a given amount of materials will effectively lower the overall cost of the electrochemical cells.

The actual discharge specific capacity of the disclosed electrochemical cells 10, when normalized with respect to the amount of cathode active material 16, is larger than the theoretical discharge specific capacity when normalized with respect to the amount of cathode active material 16. Similarly, the actual discharge specific capacity of electrochemical cell 10, when normalized with respect to the amount of the anode active material 20 is larger than the theoretical discharge specific capacity when normalized with respect to anode active material 20.

The electrochemical cells of the present disclosure can exhibit an advantageous self-charging ability when the total number of anodic electrons that the anode active material of the electrochemical cell can store is less than the total number of cathodic electrons that the cathode active material of the electrochemical cell can store. As a result, a self-charging electrochemical cell can be manufactured using less anode active material, in comparison to the amount of cathode active material required.

Electrochemical Cell

The self-charging batteries of the present disclosure include at least one self-charging electrochemical cell 10, including cathode 14 with cathode active material 16, and electrolyte 30. Each self-charging electrochemical cell 10 may further include anode 18 that includes anode active material 20, and optionally includes an anode surface coating 22. The self-charging batteries 12 of the disclosure can have the form and/or conformation of any conventional or typical battery, such as by being formed as button cells, pouch cells, prismatic cells, cylindrical cells, flow cells, in alternating plates, or in jelly rolls, among others.

Cathode active material 16 of electrochemical cell 10 is selected so that the cathode active material can transform into discharge product 28 either during, or after, discharge of electrochemical cell 10. In addition, electrolyte 30 is in contact with the cathode, and the cathode active material and the electrolyte can be selected so that the solubility of the cathode active material in the electrolyte is less than the solubility of the discharge product in the electrolyte.

The self-charging electrochemical cell can further include a separator 32 that separates the cathode from the anode or from the anode current collector. In some embodiments, the electrolyte itself may also work as such a separator. Electrolyte 30 and/or separator 32 can be configured to be larger in their width and/or length than one or both of cathode current collector 24 and anode current collector 26, in order to avoid contact between anode 18 and cathode 14.

In some cases, the disclosed self-charging electrochemical cell 10 includes an anode current collector 26, but does not initially include an anode active material 20. Anode active material 20 can then be deposited onto, or be intercalated with, anode current collector 26 during an initial charging of the self-charging battery 12 including electrochemical cell 10. In such cases, electrolyte 30 can be positioned in cathode 14 and/or between anode current collector 26 and cathode 14. In some embodiments, anode current collector 26 and/or cathode current collector 24 correspond to a cell housing 34 of self-charging electrochemical cell 10.

Cathode

Cathode 14 typically includes one or more cathode active materials 16. The cathode active material is typically involved in one or more of the reduction/oxidation (or redox) reactions occurring within electrochemical cell 10, gaining or losing electrons in the course of the reactions. Cathode active material 16 may constitute the entirety of cathode 14, but is typically only a component of, or a coating on, cathode 14.

Cathode active material 16 can be generated in situ by the selection of the various components of electrochemical cell 10, such as electrolyte 30 and additional components thereof, optionally followed by the application of cathode current collector 24 to electrochemical cell 10.

The particular composition of cathode active material 16 need not be particularly restricted provided the cathode active material can store and release ions. For example, cathode active material 16 can be a metal, a metal complex, an inorganic carbon (e.g., graphite, graphene, graphene oxide, reduced graphene oxide, activated carbon, carbon nanotube, carbon dot), sulfur, a metal sulfide (e.g., metal titanium disulfide, metal polysulfide, $M_2S$, $M_2S_2$, $M_2S_4$, $M_2S_6$, $M_2S_8$, $MV_{0.5}Ti_{0.5}S_2$, where M is a metal), a sulfur-containing material (e.g., sulfate, organosulfur (e.g., poly(sulfur-random-(1,3-diisopropenylbenzene)), sulfurized polyacrylonitrile)), a metal oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M''O_2$, $M'_{1-w}(M''_xM'''_y)O_2$, $M_{1-w}(Mn_xNi_yCo_z)O_2$, $M_{1-w}(Mn_xNi_y-Co_zAl_w)O_2$, $M_{1-w}(Ni_xCo_yAl_z)O_2$, $M'_{1-w}(Ni_xCo_yM''_z)O_2$, $M'_{1-w}(Ni_xMn_yM''_z)O_2$, $M'M''M'''_2O_4$, $M_xV_yO_z$, $M'M''PO_4$, $M'M''_xM'''_{1-x}PO_4$, where M', M'', and M''' may be different metals, metal titanates, metal iron phosphates, metal nickel manganese cobalt oxides, metal nickel cobalt aluminum oxides, metal cobalt oxides, metal nickel oxides, and metal manganese oxides, among others).

Alternatively, or in addition, cathode active material 16 can be or include an organic material or organic compound (e.g., truxenone, truxenone derivatives, phenoxazine, phenoxazine derivatives, phenothiazine, phenothiazine derivatives (e.g., 10-acetylphenothiazine, 10-[2-(2-methoxyethoxy)ethyl]-10H-phenothiazine), quinone, quinone derivatives (e.g., 2,2'-(2-vinylanthracene-9,10-diylidene)dimalononitrile, 2-vinylanthraquinone, anthraquinone-2,6-disulfonate, anthraquinone-1,8-disulfonate, anthraquinone-1-sulfonate, anthraquinone-1,5-disulfonic acid, 2,2'-(2-vinylanthracene-9,10-diylidene)bis(1,3-dithiole)), diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives (e.g., ethylviologen), nitroxide derivatives), an organic radical (e.g., piperidine derivatives (e.g., 4-isothiocyanato-2,2,6,6-tetramethylpiperidine 1-oxyl, 4-oxo-2,2,6,6-tetramethylpiperidine 1-oxyl, 4-(2-iodoacetamido)-2,2,6,6-tetramethylpiperidine 1-oxyl, 4-amino-2,2,6,6-tetramethylpiperidine 1-oxyl, 4-methacryloyloxy-2,2,6,6-tetramethylpiperidine 1-oxyl, 2,2,6,6-tetramethylpiperidine 1-oxyl, 4-acetamido-2,2,6,6-tetramethylpiperidine 1-oxyl, 4-amino-2,2,6,6-tetramethylpiperidine 1-oxyl, 4-(2-chloroacetamido)-2,2,6,6-tetramethylpiperidine 1-oxyl, 2,2,6,6-tetramethyl-4-(2-propynyloxy)piperidine 1-oxyl, 2,2,6,6-tetramethylpiperidine 1-oxyl, 4-carboxy-2,2,6,6-tetramethylpiperidine 1-oxyl, 4-glycidyloxy-2,2,6,6-tetramethylpiperidine 1-oxyl, 4-cyano-2,2,6,6-tetramethylpiperidine 1-oxyl, 4-oxo-2,2,6,6-tetramethylpiperidine 1-oxyl, bis(2,2,6,6-tetramethyl-4-piperidyl-1-oxyl) sebacate, 4-methoxy-2,2,6,6-tetramethylpiperidine 1-oxyl), pyrrolidine derivatives (e.g., 3-carboxy-2,2,5,5-tetramethylpyrrolidine 1-oxyl, 16-DOXYL-stearic acid), imidazoline derivatives (e.g., 2-phenyl-4,4,5,5-tetramethylimidazoline-3-oxide-1-oxyl, 2-(4-nitrophenyl)-4,4,5,5-tetramethylimidazoline-3-oxide-1-oxyl), 1,1-diphenyl-2-picrylhydrazyl, galvinoxyl).

Alternatively, or in addition, cathode active material 16 can be or include a halide, or a halogen-containing material.

In selected embodiments, cathode active material 16 can include one or more organic moieties, where an organic moiety is a fragment or substituent of a larger compound. Where cathode active material 16 includes an organic moiety, the organic moiety can be derived from an appropriate organic material or organic compound, as described above. Examples of appropriate organic moieties include alkyl groups, alkenyl groups, alkynyl groups, acyl groups, alkylamino groups, and aryl groups, among others. In one aspect, cathode active material 16 can include an organic compound that includes a heteroatom, such as boron, oxygen, nitrogen, sulfur, phosphorous, fluorine, chlorine, and bromine, among others. Alternatively, or in addition, cathode active material 16 can include an organic material or organic compound that includes one or more aromatic groups.

In one embodiment, where cathode active material 16 is or includes a metal or a metal complex, where the metal is an alkali metal (e.g., lithium, sodium, potassium), an alkaline earth metal (e.g., magnesium, calcium), or an amphoteric metal (e.g., aluminum, zinc). Preferably cathode active material 16 includes an alkali metal or alkaline earth metal, and more preferably an alkali metal, as alkali metal-containing materials can provide high energy densities. Cathode active material 16 can optionally and additionally include electrolyte material, and/or can be applied to cathode current collector 24.

Cathode active material 16 can include or be present as a composition of solid particles. When cathode active material 16 incorporates solid particles, the average particle size of cathode active material 16 can vary from about 5 nm to about 50 μm, and cathode active material 16 can exhibit an average pore size of about 0.1 nm to about 1 μm. Preferably, the average particle size of such a cathode active material is greater than about 500 nm and less than about 50 μm. More preferably, the average particle size of such a cathode active material is greater than about 1 μm and less than about 30 μm. Where cathode active material 16 is or includes a composition of solid particles, the average pore size of cathode active material 16 can be less than about 1 μm. Preferably, the average pore size of cathode active material 16 is greater than about 1 nm and less than about 500 nm. More preferably, the average pore size of cathode active material 16 is greater than about 5 nm and less than about 200 nm.

Cathode 14 optionally further includes an electrically-conductive material. The electrically-conductive material can be or include a porous carbon material that includes one or more of carbon black, carbon nanotubes, carbon nanofibers, carbon dots, activated carbon, amorphous carbon, graphite, graphene, graphene oxide, reduced graphene oxide, and graphene nanoribbons. Where cathode 14 includes a porous carbon material, it is preferably carbon nanotubes and/or carbon nanofibers, and more preferably includes carbon nanotubes due to the resulting high aspect ratio and durability.

When present, the porous carbon material can be doped with one or more heteroatoms selected from boron, oxygen, nitrogen, sulfur, phosphorous, fluorine, chlorine, and bromine. Cathodes including a porous carbon material doped with nitrogen and/or fluorine are preferred, with nitrogen-doped materials particularly preferred as they permit lower charge transfer resistances. The electrically-conductive material is optionally a cathode active material, provided that the selected cathode active material can store and release ions during operation of the self-charging battery 12. The electrically conductive material can be in contact with cathode active material 16. In additional aspects and embodiments, the porous carbon material can be in the form of particles, powders, paper, foam, fibers, sheets, discs, rods, and/or foils, among others.

When present, the electrically-conductive material may have an average particle size or diameter of about 5 nm to about 50 μm. Typically, the average particle size or diameter of the electrically-conductive material is less than about 50 μm. Preferably, the average particle size of the electrically-conductive material is greater than about 50 nm and less than about 40 μm. More preferably, the average particle size of the electrically-conductive material is greater than about 500 nm and less than about 30 μm. The electrically-conductive material may have an average pore size of less than about 1 μm. For example, the electrically-conductive material may have an average pore size of about 0.1 nm to about 1 μm. Preferably, the average pore size of the electrically-conductive material is greater than about 1 nm and less than about 500 nm. More preferably, the average pore size of the electrically-conductive material is greater than about 5 nm and less than about 200 nm.

In some embodiments, the average particle size or diameter of the particles making up cathode active material 16 and the particles of an electrically-conductive material of cathode 14 may be inversely correlated. For example, where the average particle size of cathode active material 16 is in the range of about 10 μm to about 50 μm, that of the electrically conductive material can be about 10 nm to about 500 nm, or vice versa. Typically, one or more of cathode active materials 16 and the electrically-conductive materials include particles with an average particle size or diameter of greater than about 50 nm and less than about 50 μm, preferably greater than about 500 nm and less than about 40 μm, more preferably greater than about 1 μm and less than about 30 μm.

Any suitable electrically-conductive material may be used for the presently disclosed cathodes 14, which may have the same or different formulation. Cathode active material 16 and/or electrically-conductive material may be shaped into a planar surface, and/or be a particulate solid. Where cathode active material 16, an electrically-conductive material, and/or electrolyte 30 is particulate, the particles may have any suitable shape, including spherical, cubic, cuboid, conic, pyramidal, cylindrical, rectangular prismatic, hexagonal prismatic, hemispherical, triangular prismatic, pentagonal prismatic, octagonal prismatic, toroidal, octahedral, and dodecahedral, among others.

Cathode active material 16 may be or incorporate a gas. As used herein, "gas" includes materials that are a gas at normal temperature and pressure (NTP), but in addition can include vaporized solids and/or vaporized liquids, and may refer to a composition of a single gas or a mixture of gases, without limitation. NTP is defined as 20° C. (293.15 K, 68° F.) and 1 atm (101.325 kN/m$^2$, 101.325 kPa, 14.7 psia, 0 psig, 29.92 inches of Hg, 407 inches of H$_2$O, and 760 Torr).

Where cathode active material 16 incorporates a gas, the gas is typically not a gas that is considered chemically inert, such as for example, nitrogen, helium, neon, argon, krypton, xenon, radon, or any combinations thereof, as such substantially inert gases are typically not susceptible to chemical reaction to any appreciable or measurable extent under less than forcing conditions.

Where cathode active material 16 is or includes a gas, the gas is typically capable of being reduced during operation of electrochemical cell 10 (i.e. it is a reducible gas). Such reducible gases can include one or more of oxygen atom (oxygen (O$_2$), carbon dioxide (CO$_2$), carbon monoxide (CO), ozone (O$_3$), nitrous oxide (N$_2$O), nitrogen dioxide (NO$_2$)), sulfur atom (sulfur (Ss), sulfur hexafluoride (SF$_6$), sulfur dioxide (SO$_2$), carbon disulfide (CS$_2$), carbonyl sulfide (COS), hydrogen sulfide (H$_2$S), methanethiol (CH$_3$SH), dimethyl sulfide ((CH$_3$)$_2$S), ethanethiol (CH$_3$CH$_2$SH)), and/or halogen atom (chlorine (Cl$_2$), carbon tetrachloride (CCl$_4$)). The reducible gas may include preferably one or more oxygen atoms and halogen atoms, and more preferably one or more oxygen atoms, as in some cases halogenated gases may be somewhat corrosive.

Cathode 14 optionally includes an electrocatalyst that can include one or more the platinum group elements (e.g, ruthenium (Ru), rhodium (Rh), palladium (Pd), osmium (Os), iridium (Ir), and platinum (Pt)), where the electrocatalyst may includes one or more metal compounds and/or metal complexes. Among the platinum group elements, the electrocatalyst preferably includes one or more of ruthenium and iridium. Particularly preferably, an electrocatalyst that includes iridium is particularly preferable for its ability to generate stabilized free radicals, or specific products that possess higher solubilities in a solution of electrolyte 30.

Cathode 14 optionally further includes one or more of a polymeric binder, a plasticizer, and a carboxylic acid. Where cathode 14 includes a polymeric binder, the polymeric binder may help form a solid cathode from a cathode active material. Appropriate polymeric binders for the purposes of this disclosure may include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, styrene-butadiene-rubber, sodium carboxymethyl cellulose, among others. In a particular embodiment, the polymeric binder includes one or poly (ethylene oxide) or poly (vinylidene fluoride).

Where cathode 14 includes a plasticizer, the plasticizer can be a material that is added to an organic or polymeric material to make it softer, more flexible, and/or to increase its plasticity. Suitable plasticizers for the purpose of the present disclosure can include succinonitrile, glutaronitrile, adiponitrile, ethylene carbonate, propylene carbonate, dimethylformamide, dimethyl sulfoxide, γ-butyrolactone, sulfolane, 3-methyl-2-oxazolidinone, butylene carbonate, phthalate derivatives, trimellitates, adipates, sebacates, or maleates, or any combination thereof, among others. In one embodiment, the plasticizer can include succinonitrile.

Where cathode 14 includes a carboxylic acid, the carboxylic acid may be present to facilitate ion transport in and out of cathode active material 16. When present, the carboxylic acid can be a monocarboxylic acid or a polycarboxylic acid. When the carboxylic acid is a polycarboxylic acid, it may be oxalic acid.

Where cathode 14 includes an electrically-conductive material with one or more additional materials, polymeric binders, and plasticizers, the electrically-conductive material can be applied to a current collector using any suitable application technique. For example, the electrically-conductive material can be cast into a film and then deposited onto the desired current collector.

Cathode active material 16 can be selected so as to be soluble in electrolyte 30. The solubility of cathode active material 16 in electrolyte 30 can be less than about 1.0 M at room temperature, preferably less than about 0.5 M at room temperature, and more preferably less than about 0.2 M at room temperature. The solubility of discharge product 28 in electrolyte 30 should always be selected so as to be greater than the solubility of cathode active material 16 in electrolyte 30. The solubility ratio of cathode active material 16 to discharge product 28 in electrolyte 30 should be less than about 1.0, preferably less than about 0.5, more preferably less than about 0.3. In some cases, the solubility ratio of cathode active material 16 to discharge product 28 in electrolyte 30 is in the range of greater than about 0.01 and less than about 1.0, preferably greater than about 0.05 and less than about 0.5, more preferably greater than about 0.1 and less than about 0.3.

Discharge Product

During or after discharging electrochemical cell 10, cathode active material 16 can be converted into discharge product 28. Cathode active material 16 is typically selected so that the resulting discharge product 28 can function in electrochemical cell 10 as a redox shuttle. That is, discharge product 28 can be reduced from cathode active material 16 during discharge of electrochemical cell 10, and travel through electrolyte 30 to anode 18, where discharge product 28 is oxidized into a charge product 36, which subsequently diffuses back to cathode 14. The redox shuttle of the present disclosure, including discharge product 28, is untraditional in that the discharge product is reduced on the surface of the cathode and is oxidized on the surface of the anode.

Figure 2:
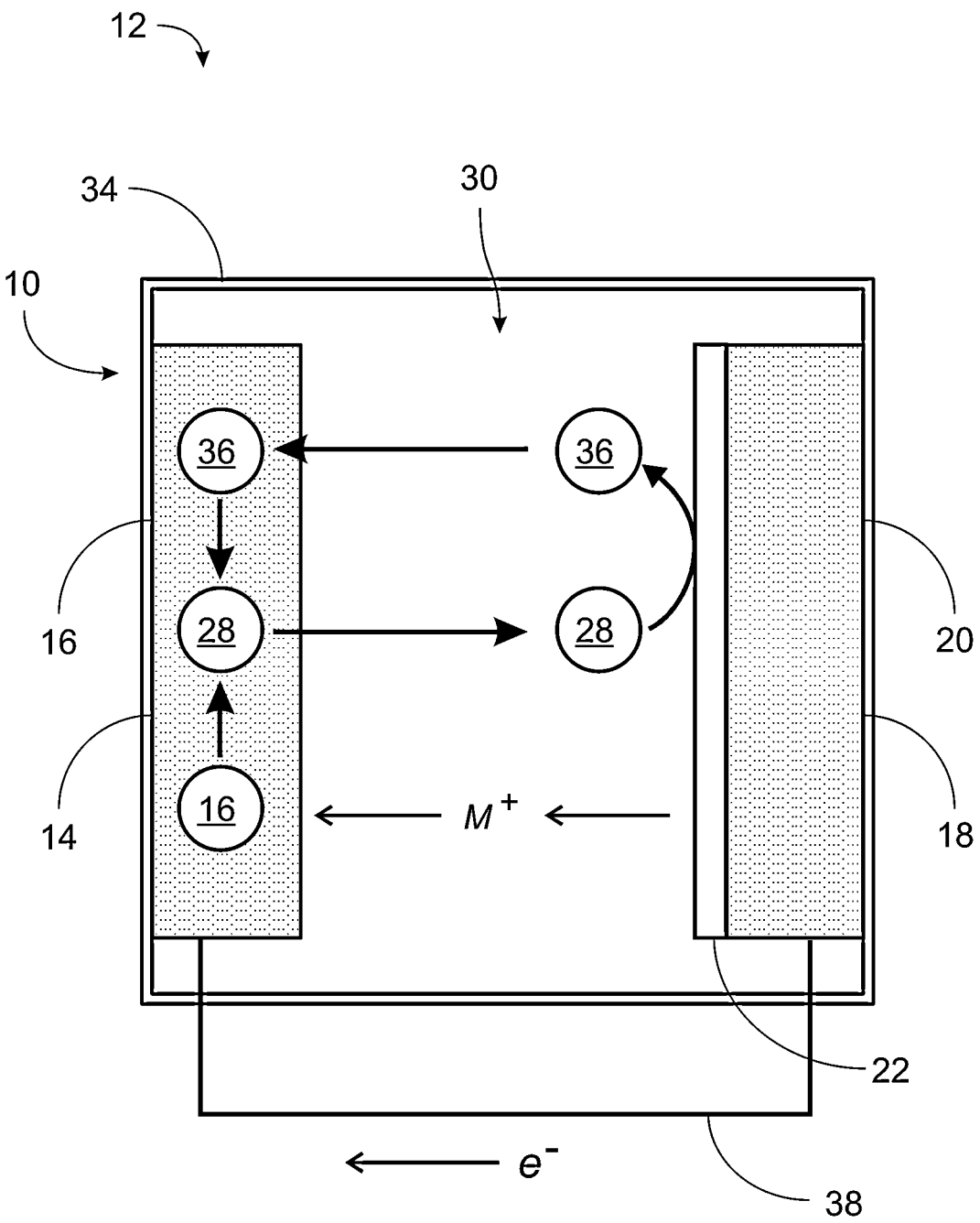
FIG. 2 is a schematic depiction of a discharging process of an exemplary self-charging electrochemical cell of the present disclosure.

A discharging process of a self-charging electrochemical cell 10 of the present disclosure is depicted schematically in FIG. 2. As shown, electrochemical cell 10 includes cathode 14 with cathode active material 16, electrolyte 30 (which may further include separator 32), and anode 18 with anode active material 20 and anode surface coating 22. During a discharge of electrochemical cell 10, at least a portion of anode active material 20 is oxidized, thereby donating electrons to cathode active material 16 via an external circuit 38. Overall charge is balanced by migration of ions (shown as M$^+$) to cathode active material 16 through electrolyte 30. Cathode active material 16 is then reduced via the ions and electrons donated from anode active material 20, and is converted to discharge product 28.

By careful selection of cathode active material 16, the resulting discharge product 28 will exhibit a higher solubility in electrolyte 30 than cathode active material 16. As a result, at least a portion of discharge product 28 will dissolve in electrolyte 30, and subsequently make contact with anode 18 or anode surface coating 22 while electrochemical cell 10 is discharging, and will therefore be oxidized at anode 18 instead of anode active material 20, resulting in charge product 36. Charge product 36 can then move away from anode 18 or anode surface coating 22 to cathode 14, where charge product 36 is reduced back to discharge product 28.

In one embodiment of the present disclosure, discharge product 28 can include a polar material, where the polar material includes at least two elements, and the difference in electronegativity between the two elements is greater than or equal to 0.5, preferably greater than or equal to 1.0, and more preferably greater than or equal to 2.0. For example, lithium superoxide (LiO$_2$) includes lithium and oxygen, where the difference in electronegativity between lithium and oxygen is 2.46. The preferred difference in electronegativity between the two elements may, however, depend on the polarity of the electrolyte solvent that is in contact with the discharge product. In another embodiment of the present disclosure, discharge product 28 includes one or more reactive species capable of independent existence, each reactive species having one or more unpaired electrons.

Unpaired electrons are electrons that occupy an atomic or molecular orbital of singly, rather than as a member of an electron pair. As the formation of electron pairs is nearly always more energetically favorable, either in the form of a chemical bond or as a lone pair of electrons in a non-bonding orbital, unpaired electrons are relatively uncommon in chemistry. Due to the relatively higher energy of unpaired electrons, an entity having an unpaired electron can exhibit enhanced reactivity. A species having one or more unpaired electrons may also be referred to as a radical. Such radicals may be or include one or more of an organic moiety, a superoxide (moiety), a nitric oxide (moiety), a lanthanide, an actinide, a hydroxyl radical, a peroxyl radical, a perhydroxyl radical, a hydroperoxyl radical, an alkoxyl radical, and alpha oxygen. Radicals that are or include an organic moiety (an organic radical) and/or superoxide are preferred for their availability, and organic radicals are particularly preferred for their relative stability.

In another embodiment of the present disclosure, discharge product 28 includes a reducing agent, where the reducing agents is selected such that an oxidation product (charge product) of the reducing agent is a gas. The gas may be one or more of the reducible gases described herein. When the reducing agent is oxidized on the surface of the anode and converted to the gas, the gas may immediately escape due to a difference in solubility, diffusing away from the anode and the electrolyte to the cathode and the cell housing, where it can be reduced again to provide additional energy In some embodiments, discharge product 28 includes a material, compound, or complex that incorporates oxygen, i.e. that is an oxide. Discharge product 28 can include an oxide that includes one or more metal atoms, and/or hydrogen atoms. Exemplary discharge products 26 can include metal superoxides, hydrogen superoxide, trimethylphenylammonium superoxide, tetrabutylammonium superoxide, metal peroxides, hydrogen peroxide, benzoyl peroxide, diethyl ether peroxide, cumene hydroperoxide, tert-butyl hydroperoxide, and di-tert-butyl peroxide, among others. In selected embodiments, discharge product 28 can include a superoxide compound and/or one or more superoxide moieties. In other selected embodiments, discharge product 28 can include one or more peroxide compounds and/or one or more peroxide moieties.

Anode

When present in electrochemical cell 10, anode 18 typically includes one or more anode active materials 20. Anode active material 20 is typically involved in one or more of the redox reactions occurring within self-charging electrochemical cell 10, thereby gaining or losing electrons in the course of those reactions. Anode active material 20 may constitute the entirety of anode 18, but is more typically a component of, or a coating on, anode 18.

Anode active material 20 can be generated in situ by careful selection of the components of electrochemical cell 10, such as for example electrolyte 30 and/or additional components thereof, and optionally by the application of anode current collector 26 to electrochemical cell 10. The selection of anode active material 20 is not particularly restricted provided that the selected material can store and release ions. For example, anode active material 20 can be an alkali metal (such as lithium, sodium, and/or potassium), an alkaline earth metal (such as, magnesium and/or calcium), an amphoteric metal (such as aluminum and/or zinc), a metalloid (such as boron, germanium, arsenic, antimony, tin, tellurium, polonium, and/or silicon), a metal complex, an inorganic carbon (such as graphite, graphene, graphene oxide, reduced graphene oxide, activated carbon, carbon nanotubes, and/or carbon dots), sulfur, a sulfide (such a metal titanium disulfide $MV_{0.5}Ti_{0.5}S_2$, where M is a metal, metal sulfide ($M_2S$), metal polysulfide (e.g., $M_2S_2$, $M_2S_4$, $M_2S_6$, $M_2S_8$)), a sulfur-containing compound or material (such as a sulfate or organosulfur compound (e.g., poly(sulfur-random-(1,3-diisopropenylbenzene)), sulfurized polyacrylonitrile)), an oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M''O_2$, $M'_{1-w}(M''_xM'''_y)O_2$, and/or metal titanate), an organic material or compound (e.g., truxenone, truxenone derivatives, phenoxazine, phenoxazine derivatives, phenothiazine, phenothiazine derivatives (e.g., 10-acetylphenothiazine, 10-[2-(2-methoxyethoxy)ethyl]-10H-phenothiazine), quinone, quinone derivatives (e.g., 2,2'-(2-vinylanthracene-9,10-diylidene)dimalononitrile, 2-vinylanthraquinone, anthraquinone-2,6-disulfonate, anthraquinone-1,8-disulfonate, anthraquinone-1-sulfonate, anthraquinone-1,5-disulfonic acid, 2,2'-(2-vinylanthracene-9,10-diylidene)bis(1,3-dithiole)), diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives (e.g., ethylviologen), nitroxide derivatives), an organic radical (e.g., piperidine derivatives (e.g., 4-isothiocyanato-2,2,6,6-tetramethylpiperidine 1-oxyl, 4-oxo-2,2,6,6-tetramethylpiperidine 1-oxyl, 4-(2-iodoacetamido)-2,2,6,6-tetramethylpiperidine 1-oxyl, 4-amino-2,2,6,6-tetramethylpiperidine 1-oxyl, 4-methacryloyloxy-2,2,6,6-tetramethylpiperidine 1-oxyl, 2,2,6,6-tetramethylpiperidine 1-oxyl, 4-acetamido-2,2,6,6-tetramethylpiperidine 1-oxyl, 4-amino-2,2,6,6-tetramethylpiperidine 1-oxyl, 4-(2-chloroacetamido)-2,2,6,6-tetramethylpiperidine 1-oxyl, 2,2,6,6-tetramethyl-4-(2-propynyloxy)piperidine 1-oxyl, 2,2,6,6-tetramethylpiperidine 1-oxyl, 4-carboxy-2,2,6,6-tetramethylpiperidine 1-oxyl, 4-glycidyloxy-2,2,6,6-tetramethylpiperidine 1-oxyl, 4-cyano-2,2,6,6-tetramethylpiperidine 1-oxyl, 4-oxo-2,2,6,6-tetramethylpiperidine 1-oxyl, bis(2,2,6,6-tetramethyl-4-piperidyl-1-oxyl) sebacate, 4-methoxy-2,2,6,6-tetramethylpiperidine 1-oxyl), pyrrolidine derivatives (e.g., 3-carboxy-2,2,5,5-tetramethylpyrrolidine 1-oxyl, 16-DOXYL-stearic acid), imidazoline derivatives (e.g., 2-phenyl-4,4,5,5-tetramethylimidazoline-3-oxide-1-oxyl, 2-(4-nitrophenyl)-4,4,5,5-tetramethylimidazoline-3-oxide-1-oxyl), 1,1-diphenyl-2-picrylhydrazyl, galvinoxyl) or any combination thereof.

In some embodiments, anode active material 20 can include one or more organic moieties, where an organic moiety is a fragment or substituent of a larger compound. Where anode active material 20 includes an organic moiety, the organic moiety can be derived from an appropriate organic material or organic compound, as described above. Examples of appropriate organic moieties include alkyl groups, alkenyl groups, alkynyl groups, acyl groups, alkylamino groups, and aryl groups, among others. In one aspect, anode active material 20 includes an organic compound that includes one or more heteroatoms, such as boron, oxygen, nitrogen, sulfur, phosphorous, fluorine, chlorine, and bromine, among others. Alternatively, or in addition, anode active material 20 can include an organic material that includes one or more aromatic groups.

In a preferred embodiment, anode active material 20 is or includes a metal, a metal alloy, or a metal complex or compound. In this embodiment the metal is preferably an alkali metal or an alkaline earth metal. More preferably, anode active material 20 includes an alkali metal due to its ability to provide high energy densities to the resulting electrochemical cells. Anode active material 20 can optionally and additionally include electrolyte material and/or can be applied to anode current collector 26.

Anode active material 20 can be present as a composition of solid particles. The average particle size of an appropriate anode active material can vary from about 5 nm to about 50 μm, and may exhibit an average pore size of about 0.1 nm to about 1 μm. Preferably, the average particle size of anode active material 20 is greater than about 500 nm and less than about 50 μm. More preferably, the average particle size of anode active material 20 is greater than about 1 μm and less than about 30 μm. Where anode active material 20 is present as a composition of solid particles, the average pore size of the anode active material may be less than about 1 μm. Preferably, the average pore size of anode active material 20 is greater than about 1 nm and less than about 500 nm. More preferably, the average pore size of anode active material 20 is greater than about 5 nm and less than about 200 nm.

Anode 18 optionally further includes an electrically-conductive material. The electrically-conductive material can be or include a porous carbon material that includes one or more of carbon black, carbon nanotubes, carbon nanofibers, carbon dots, activated carbon, amorphous carbon, graphite, graphene, graphene oxide, reduced graphene oxide, and graphene nanoribbons. Where anode 18 includes a porous carbon material, it preferably includes carbon nanotubes and/or carbon nanofibers, where carbon nanotubes are particularly preferred due to their high aspect ratio and durability.

When present, the porous carbon material can be doped with one or more heteroatoms selected from boron, oxygen, nitrogen, sulfur, phosphorous, fluorine, chlorine, and bromine. Anodes including a porous carbon material doped with nitrogen and/or fluorine, particularly nitrogen are preferred as they permit lower charge transfer resistances. The electrically-conductive material is optionally an anode active material provided that the selected anode active material can store and release ions during operation of the self-charging battery 12. In further aspects and embodiments, the porous carbon material, when present, is in the form of particles, powders, paper, foam, fibers, sheets, discs, rods, and/or foils, among others.

When present, the electrically-conductive material may have an average particle size or diameter of about 5 nm to about 50 μm. Typically, the average particle size or diameter of the electrically-conductive material is less than about 50 μm. Preferably, the average particle size of the electrically-conductive material is greater than about 50 nm and less than about 40 μm. More preferably, the average particle size of the electrically-conductive material is greater than about 500 nm and less than about 30 μm. The electrically-conductive material may have an average pore size of less than about 1 μm. For example, the electrically-conductive material may have an average pore size of about 0.1 nm to about 1 μm. Preferably, the average pore size of the electrically-conductive material is greater than about 1 nm and less than about 500 nm. More preferably, the average pore size of the electrically-conductive material is greater than about 5 nm and less than about 200 nm.

In some embodiments, the average particle size or diameter of the particles making up anode active material 20 and the particles of the electrically-conductive material of anode 18 may be inversely correlated. For example, where the average particle size of the anode active material is in the range of about 10 μm to about 50 μm, that of the electrically conductive material can be about 10 nm to about 500 nm, or vice versa. Typically, one or more of anode active material 20 and the electrically-conductive materials include particles with an average particle size or diameter of greater than about 50 nm and less than about 50 μm, preferably greater than about 500 nm and less than about 40 μm, more preferably greater than about 1 μm and less than about 30 μm.

Anode 18 of electrochemical cell 10 typically includes an electrically-conductive material as a substrate, or an anode body, upon or in which anode active material 20 and/or electrolyte 30 can be deposited or formed. Any suitable electrically-conductive material may be used for the disclosed anodes, which may have the same or different formulation. The anode active material and/or electrically-conductive material may be shaped into a planar surface, and/or be a particulate solid. Where the anode active material, electrically-conductive material, and/or electrolyte is particulate, the particles may have any suitable shape, including spherical, cubic, cuboid, conic, pyramidal, cylindrical, rectangular prismatic, hexagonal prismatic, hemispherical, triangular prismatic, pentagonal prismatic, octagonal prismatic, toroidal, octahedral, and dodecahedral, among others.

Anode 18 optionally further includes one or more of a polymeric binder, a plasticizer, and a carboxylic acid. Where anodes 18 includes a polymeric binder, the polymeric binder may help form a solid anode from an anode active material. Appropriate polymeric binders for the purposes of this disclosure may include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, styrene-butadiene-rubber, sodium carboxymethyl cellulose, among others. In a particular embodiment, the polymeric binder includes poly (ethylene oxide) and/or poly (vinylidene fluoride).

Where anode 18 includes a plasticizer, the plasticizer can include succinonitrile, glutaronitrile, adiponitrile, ethylene carbonate, propylene carbonate, dimethylformamide, dimethyl sulfoxide, γ-butyrolactone, sulfolane, 3-methyl-2-oxazolidinone, butylene carbonate, phthalate derivatives, trimellitates, adipates, sebacates, or maleates, or any combination thereof, among others. In one embodiment, the plasticizer can include succinonitrile.

Where anode 18 includes a carboxylic acid, the carboxylic acid may be present to facilitate ion transport in and out of anode active material 20. When present, the carboxylic acid can be a monocarboxylic acid or a polycarboxylic acid. When the carboxylic acid is a polycarboxylic acid, it may be oxalic acid.

Where anode 17 includes an electrically-conductive material with one or more additional materials, polymeric binders, and plasticizers, the electrically-conductive material can be applied to a current collector using any suitable application technique. For example, the electrically-conductive material can be cast into a film and then deposited onto the desired current collector.

Anode 18 can optionally further include an anode surface coating 22, where the coating covers at least a portion of a surface of anode active material 20. Anode surface coating 22 is optionally electrically conductive. By "electrically conductive" is meant that anode surface coating 22 exhibits an electrical conductivity that is greater than or equal to $10^{-3}$ S/cm. Preferably, anode surface coating 22 exhibits an electrical conductivity of greater than or equal to $10^{-1}$ S/cm. More preferably, anode surface coating 22 has an electrical conductivity of greater than or equal to 10 S/cm. In one embodiment, anode surface coating 22 includes one or more of carbon, silver, copper, nickel, and titanium, where each element may be present as a compound or complex. Among the surface coating elements, silver and copper are preferred, and silver (silver compound/complex) is particularly preferred for its high electrical conductivity.

Electrolyte

Electrolyte 30 is a material that is capable of acting as a conduit for ion transport within electrochemical cell 10 of self-charging battery 12 through its interaction with the electrodes of the cell. Electrolyte 30 can be a liquid, a solid, a gel, or a liquified gas that includes an electrolyte material 40 that is ionically conductive. Electrolyte material 40 can be selected to have an ionic conductivity of greater than or equal to $10^{-10}$ S/cm and an electrical conductivity of less than or equal to $10^{-1}$ S/cm. Preferably, electrolyte material 40 has an ionic conductivity of greater than or equal to $10^{-8}$ S/cm and an electrical conductivity of less than or equal to $10^{-3}$ S/cm. More preferably, electrolyte material 40 has an ionic conductivity of greater than or equal to $10^{-6}$ S/cm and an electrical conductivity of less than or equal to $10^{-5}$ S/cm.

Where electrolyte 30 is present in electrochemical cell 10 as a solid, electrolyte 30 is optionally present in the form of a film, a foil, a tape, a paper, a sheet, a layer, or the like. The solid electrolyte material can include one or more polymers, glass, phosphates, fluorophosphates, carbonates, amines, borates, fluoroborates, halides, halates, oxohalides, oxides (e.g., $MO_2$, $M_2O_3$, $M_2B_2O_5$, $M_2O$, MOH, $M_2O_2$, $M_2CO_3$, $P_2O_5$, $MPO_4$, $M_2M'_3O_7$, wherein M is a metal or metalloid), perovskites, antiperovskites (e.g., $M_3OBr$, $M_3OCl$, $M_2OHBr$, $M_2OHCl$, wherein M is a metal or metalloid), LISICON-type electrolytes (e.g., $M_{1+x}M'_xM''_{2-x}(PO_4)_3$, $M_{2+2x}M'_{1-x}M''O_4$, $M_{(3+x)}M'_xV_{(1-x)}O_4$, $M_{(4-x)}M'_{(1-x)}P_xO_4$, $M_{1+x+y}M'_xM''_{2-x}Si_yP_{3-y}O_{12}$, $M_{1+x}M'_xM''_yTi_{2-x-y}P_3O_{12}$, $M_{1+x+3y}M'_xM''_{2-x}(Si_yPO_4)_3$, $M_{14}M'M''_4O_{16}$, $M_{4-x}M'_xV_xO_4$, wherein M is a metal or metalloid), garnets (e.g., $M_7M'_3M''_2O_{12}$, $M_{7-x}M'_3M''_{2-x}Nb_xO_{12}$, $M_7M'_{3-x}M''_xZr_{2-x}Nb_xO_{12}$, $M_{6+x}M'_3M''_{1+x}Ta_{1-x}O_{12}$, wherein M is a metal or metalloid), sulfides (e.g., $M_6PS_5Cl$, $M_{9.54}M'_{1.74}P_{1.44}S_{11.7}Cl_{0.3}$, $M_{10}M'P_2S_{12}$, $M_7PS_6$, $M_7P_3S_{11}$, $M_{3.25}P_{0.95}S_4$, $M_{3+x}M'_xP_{1-x}S_4$, wherein M is a metal or metalloid), thio-LISICON type electrolytes (e.g., $M_{(4-x)}M'_{(1-x)}P_xS_4$, wherein M is a metal or metalloid), oxynitrides, nitrides, or the like (LISICON is an acronym for Lithium Super Ionic CONductor).

Where electrolyte 30 is present in electrochemical cell 10 as a solid, electrolyte 30 is optionally present as a composition of solid particles. An average particle size of an appropriate electrolyte material may vary from about 5 nm to about 30 μm, and may exhibit an average pore size of about 0.1 nm to about 500 nm. Typically, the average particle size or diameter of an appropriate electrolyte material is less than about 30 μm. Preferably, the average particle size of the electrolyte material is greater than about 10 nm and less than about 20 μm. More preferably, the average particle size of the electrolyte material is greater than about 20 nm and less than about 10 μm. Where electrolyte 30 is present as a composition of solid particles, an average pore size of the electrolyte material may be less than about 500 nm. Preferably, the average pore size of the electrolyte material is greater than about 0.5 nm and less than about 200 nm. More preferably, the average pore size of the electrolyte material is greater than about 1 nm and less than about 100 nm.

Where electrolyte 30 is present in electrochemical cell 10 as a liquid, electrolyte 30 is optionally present as a solution that includes a solvent and a solute dissolved in the solvent. Electrolyte 30 can include a solvent that optionally includes one or more of water, a liquified gas, and an organic liquid.

Where electrolyte 30 includes a liquified gas, the liquified gas can include one or more of a methane (e.g., methane, fluoromethane, difluoromethane), an ethane (e.g., ethane, fluoroethane, 1,1-difluoroethane, 1,1,1,2-tetrafluoroethane), a propane (e.g., propane, 2-fluoropropane), a butane (e.g., butane, fluorobutane), an ethylene, an acetylene, a propylene, carbon monoxide, and carbon dioxide.

Where electrolyte 30 includes an organic liquid, the organic liquid can include one or more organic carbonates, ethers, esters, amides, halogenated liquids, nitriles, or ionic liquids.

Where electrolyte 30 includes an organic carbonate, the organic carbonate can be, for example, propylene carbonate, dimethyl carbonate, diethyl carbonate, ethyl methyl carbonate, ethylene carbonate, vinylene carbonate, fluoroethylene carbonate, dipropyl carbonate, 4-vinyl-1,3-dioxolan-2-one, 4-chloro-1,3-dioxolan-2-one, diethyl 2,5-dioxahexanedioate, bis(2,2,2-trifluoroethyl) carbonate, 4-fluoro-1,3-dioxolan-2-one, dimethyl 2,5-dioxahexanedioate, or dibutyl carbonate, among others.

Where electrolyte 30 includes an ether, the ether can be, for example, dimethoxyethane, dimethoxymethane, dimethyl ether, diethyl ether, ethylene glycol, ethylene glycol derivatives (diglyme, triglyme, tetraglyme), tetrahydrofuran, dioxolane, or dioxane, among others.

Where electrolyte 30 includes an ester, the ester can be, for example, triethyl borate, trimethyl borate, tris(2,2,2-trifluoroethyl) borate, 2,4,6-trimethoxyboroxin, tributyl borate, trihexyl borate, or tripropyl borate, among others.

Where electrolyte 30 includes an amide, the amide can be, for example, dimethylformamide, dimethylacetamide, or dipropylacetamide, among others.

Where electrolyte 30 includes a halogenated liquid, the halogenated liquid may include, for example, a chlorinated liquid (such as dichloromethane), or a fluorinated liquid (such as, for example, fluoroethylene carbonate, 1,1,2,2-tetrafluoroethyl 2,2,2-trifluoroethyl ether, difluoromethyl 2,2,3,3-tetrafluoropropyl ether, methyl 2,2,3,3,3-pentafluoropropyl ether, methyl 1,1,2,2-tetrafluoroethyl ether, bis(2,2-trifluoroethyl) ether, 1,1,2,3,3,3-hexafluoropropyl methyl ether, or ethyl 1,1,2,2-tetrafluoroethyl ether).

Where electrolyte 30 includes a solvent that is a nitrile, the nitrile may include, for example, acetonitrile, propionitrile, methoxyacetonitrile, 3-methoxypropionitrile, succinonitrile, glutaronitrile, adiponitrile, tetracyanoethylene, 3,3'-oxydipropionitrile, 3-ethoxypropionitrile, 1,3,6-hexanetricarbonitrile, 1,2,2,3-propanetetracarbonitrile, malononitrile, fumaronitrile, or 3-butoxypropionitrile, among others.

Where electrolyte 30 includes an ionic liquid, the ionic liquid can be, for example, an imidazolium derivative (such as, for example, 1-ethyl-3-methylimidazolium hexafluorophosphate, 1-ethyl-3-methylimidazolium tetrafluoroborate, 1-ethyl-2,3-dimethylimidazolium bis(trifluoro-methanesulfonyl)imide, 1-ethyl-3-methylimidazolium bis(trifluoromethanesulfonyl)imide, 2,3-dimethyl-1-propylimidazolium bis(trifluoro-methanesulfonyl)imide, 1-decyl-3-methyl-imidazolium tetrafluoroborate, 1-decyl-3-methylimidazolium bis(trifluoro-methanesulfonyl)imide, 1,3-dimethylimidazolium bis(trifluoromethanesulfonyl)imide, 1-dodecyl-3-methylimidazolium bis(trifluoro-methanesulfonyl)imide, 1-ethyl-3-methyl-imidazolium nitrate, 1-ethyl-3-methylimidazolium trifluoromethanesulfonate, 1-vinylimidazole bis(trifluoro-methanesulfonyl)imide, 1-allyl-3-methylimidazolium bis(trifluoromethanesulfonyl)imide, 1-methyl-3-n-octylimidazolium trifluoro-methanesulfonate, 3-ethyl-1-vinylimidazolium bis(trifluoromethanesulfonyl)imide, 1-methyl-3-n-octylimidazolium tetrafluoroborate, 1-butyl-2,3-dimethylimidazolium tetrafluoro-borate, 1-butyl-2,3-dimethylimidazolium hexafluorophosphate, 1-butyl-3-methyl-imidazolium tetrafluoroborate, 1-butyl-3-methylimidazolium methanesulfonate, 1-butyl-3-methylimidazolium bis(trifluoromethanesulfonyl)imide, 1-butyl-3-methyl-imidazolium hexafluorophosphate, 1-butyl-2,3-dimethylimidazolium trifluoro-methanesulfonate, 1-ethyl-3-methylimidazolium methane-sulfonate, 1-butyl-3-methylimidazolium trifluoromethanesulfonate, 1-butyl-2,3-dimethyl-imidazolium bis(trifluoromethanesulfonyl)imide, 1-methyl-3-(4-sulfobutyl)imidazolium bis(tri-fluoromethanesulfonyl)imide, 1-methylimidazole bis(trifluoromethanesulfonyl)imide, 1-methyl-1H-imidazol-3- ium hexafluorophosphate, or 3,3'-(butane-1,4-diyl)bis(1-vinyl-3-imidazolium) bis(trifluoromethanesulfonyl)imide), among others.

Where electrolyte 30 includes an ionic liquid, the ionic liquid can be, for example, a pyrrolidinium derivative, (such as, for example, 1-butyl-1-methylpyrrolidinium trifluoromethanesulfonate, 1-butyl-1-methylpyrrolidinium hexafluorophosphate, 1-methyl-1-pentylpyrrolidinium bis(trifluoromethanesulfonyl)imide, 1-methyl-1-propylpyrrolidinium, bis(trifluoromethanesulfonyl)imide, 1-butyl-1-methylpyrrolidinium bis(trifluoro-methanesulfonyl) imide, 1-ethyl-1-methylpyrrolidinium tetrafluoroborate, or 1-allyl-1-methylpyrrolidinium bis(trifluoromethanesulfonyl)imide, among others).

Where electrolyte 30 includes an ionic liquid, the ionic liquid can be, for example, a pyridinium derivative (such as, for example, 1-butyl-4-methylpyridinium hexafluorophosphate, 1-butyl-4-methylpyridinium bis(trifluoro-methanesulfonyl)imide, 1-hexylpyridinium hexafluorophosphate, 1-ethyl-3-(hydroxymethyl)pyridinium ethyl sulfate, 1-butylpyridinium tetrafluoroborate, 1-butylpyridinium hexafluorophosphate, 1-butyl-4-methylpyridinium hexafluorophosphate, 1-butylpyridinium tetrafluoroborate, 1-butylpyridinium hexafluorophosphate, 1-butyl-4-methylpyridinium tetrafluoroborate, 1-ethyl-3-methylpyridinium bis(trifluoro-methanesulfonyl)imide, 1-ethyl-3-methylpyridinium ethyl sulfate, 1-methylpyridinium bis(trifluoromethanesulfonyl)imide, or 1,1'-bis[3-(trimethylammonio)propyl]-4,4'-bipyridinium, among others).

Where electrolyte 30 includes an ionic liquid, the ionic liquid can be, for example, a piperidinium derivative such as, for example, 1-butyl-1-methylpiperidinium bis(trifluoromethanesulfonyl)imide, or 1-methyl-1-propylpiperidinium bis(fluorosulfonyl)-imide, among others.

Where electrolyte 30 includes an ionic liquid, the ionic liquid can be, for example, an ammonium derivative such as, for example, methyltri-n-octylammonium bis(trifluoromethane sulfonyl)imide, ethyl(3-methoxypropyl)dimethylammonium bis(trifluoro-methanesulfonyl)imide, ethyl(2-methoxyethyl)dimethylammonium bis(trifluoromethane-sulfonyl)imide, butyltrimethyl ammonium bis(trifluoromethan-esulfonyl)imide, tetrabutyl-ammonium trifluoromethanesulfonate, methyltri-n-octylammonium bis(trifluoro-methane-sulfonyl)imide, trimethyl-propylammonium bis(trifluoromethanesulfonyl)imide, tributyl-methyl-ammonium bis(trifluoromethane sulfonyl)imide, butyltrimethylammonium bis(trifluoro-methanesulfonyl)imide, or tetrabutyl ammonium hexafluorophosphate, among others.

Where electrolyte 30 includes an ionic liquid, the ionic liquid can be, for example, a phosphonium derivative such as, for example tributylmethylphosphonium bis(trifluoromethanesulfonyl)imide, tributyl(2-methoxyethyl)-phosphonium bis(trifluoro-methane-sulfonyl)imide, tetrabutylphosphonium tetrafluoroborate, tetrabutylphosphonium hexafluorophosphate, or tributylmethyl-phosphonium bis(trifluoromethane-sulfonyl)imide, among others.

Where electrolyte 30 includes an ionic liquid, the ionic liquid can be, for example, a morpholinium derivative, or a sulfonium derivative (such as, for example, triethylsulfonium bis(trifluoromethanesulfonyl)imide)).

Where electrolyte 30 is present in electrochemical cell 10 as a solution that includes a solvent and a solute dissolved in the solvent, the solute may include one or more ionic metal complexes, such as, for example, bis(nonafluorobutanesulfonyl)imide, metal (fluorosulfonyl) (trifluoro-methanesulfonyl)imide, metal trifluoromethanesulfonate, metal tetrafluoroborate, metal hexafluorophosphate, metal bis(fluorosulfonyl)imide, metal nonafluoro-1-butanesulfonate, metal bis(trifluoromethane sulfonyl)imide, metal tricyanomethanide, metal nitrates, metal halides, metal bis(oxalato)borate, metal difluoro(oxalato)borate, or metal perchlorate, among others.

Electrolyte 30 may optionally include one or more additives, where the additives can be polymeric materials, plasticizers, phosphazenes, phosphates, sulfonyls, and carboxylic acids. Where the additive includes a polymeric material, the polymeric material can be electrically and/or ionically insulating. For example, a polymeric material having an ionic conductivity of less than or equal to $10^{-7}$ S/cm can form part of electrolyte 30 and/or cathode 14 and/or anode 18. When present, the polymeric material can include, for example, one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, styrene-butadiene-rubber, sodium carboxymethyl cellulose, in any combination. In one embodiment, the polymeric material includes one of poly(ethylene oxide) or poly(vinylidene fluoride), among others.

Where the additive includes a plasticizer, the plasticizer can include, for example, succinonitrile, glutaronitrile, adiponitrile, ethylene carbonate, propylene carbonate, dimethylformamide, dimethyl sulfoxide, $\gamma$-butyrolactone, sulfolane, 3-methyl-2-oxazolidinone, butylene carbonate, phthalate derivatives, trimellitates, adipates, sebacates, maleates, or any combination thereof, among others.

Where the additive includes a phosphazene, the phosphazene can include, for example, one or more of pentafluoro(phenoxy)cyclotriphosphazene, phosphonitrilic chloride trimer, ethoxy(pentafluoro)cyclotriphosphazene, hexaphenoxycyclo-triphosphazene, or hexafluorocyclotriphosphazene, among others.

Where the additive includes a phosphate, the phosphate may include, for example, one or more of tris(1,1,1,3,3,3-hexafluoro-2-propyl) phosphate, tris(2-butoxyethyl) phosphate, tris(2-ethylhexyl) phosphate, tris(1H,1H,5H-octafluoropentyl) phosphate, 2-ethylhexyl diphenyl phosphate, triamyl phosphate, tri-o-cresyl phosphate, triallyl phosphate, tri-m-cresyl phosphate, triethyl phosphate, tri-p-cresyl phosphate, triphenyl phosphate, trimethyl phosphate, tris(2,2,2-trifluoroethyl) phosphate.

Where the additive includes a sulfonyl, the sulfonyl may include, for example, one or more of isopropyl methyl sulfone, dimethyl sulfone, dimethyl sulfite, dipropyl sulfone, 1,3-propanesultone, 3-methylsulfolane, 1,4-butanesultone, tetrahydrothiophene 1,1-dioxide, 1,3,2-dioxathiolane 2,2-dioxide, 1,3,2-dioxathiolane 2-oxide.

Where the additive includes a carboxylic acid, the carboxylic acid may be, for example, a monocarboxylic acid or a polycarboxylic acid. When the carboxylic acid is a polycarboxylic acid, it may be oxalic acid. When present, the carboxylic acid may be present in the electrolyte at a weight percentage of between about 0.01 wt. % and about 30 wt. %, preferably between about 0.1 wt. % and about 20 wt. %, more preferably between about 1 wt. % and about 10 wt. %.

Where electrolyte 30 is or includes a gel, the gel is typically obtained by mixing an appropriate liquid electrolyte material (as described above) with an appropriate solid electrolyte material (as described above). By appropriate is meant that the liquid and solid electrolyte materials are physically and chemically compatible, and that when mixed together in a selected ratio an electrolyte gel can be obtained that exhibits the desired consistency and electrolytic properties.

Electrolyte 30 preferably includes a liquid, a liquified gas, and/or a gel as discharge product 28 is typically more readily dissolved in such electrolytes. In one embodiment, electrolyte 30 includes a solvent having a molecular weight that is less than about 300 g/mol, preferably less than about 200 g/mol, and more preferably less than about 100 g/mol, solvents having a smaller molecular weight can lead to a higher energy density for the resulting electrochemical cell. For instance, water has a molecular weight of 18.01 g/mol, dimethylacetamide has a molecular weight of 87.12 g/mol, dimethoxyethane has a molecular weight of 90.12 g/mol, dimethyl carbonate has a molecular weight of 90.08 g/mol, ethylene has a molecular weight of 88.06 g/mol, and dioxolane has a molecular weight of 74.08 g/mol.

Current Collector

Cathode current collector 24 and anode current collector 26, when present, may be the same or different, and can include any suitable and compatible conductive material. Each current collector can include one or more metals such as alkaline earth metals, transition metals, rare earth metals, post-transition metals, and alkali metals, or any alloys or combination thereof. In particular, current collector may include at least one of aluminum, an aluminum alloy, an aluminum compound or complex, copper, a copper alloy, a copper compound or complex, silver, a silver alloy, a silver compound or complex, nickel, a nickel alloy, a nickel compound or complex, duplex steel, stainless steel, or any combination thereof. Alternatively, or in addition, each current collector can be a metallic current collector that may include one or more of molybdenum, titanium, and zirconium metals or their alloys. Molybdenum is particularly preferable for its efficiency in corrosion prevention. Each current collector can be in contact with an electrically-conductive material, for example by being coated with an electrically-conductive material, such as for example a porous inorganic carbon material that is carbon black, carbon nanotubes, carbon nanofibers, carbon dots, activated carbon, amorphous carbon, microporous carbon, mesoporous carbon, porous carbon, graphite, graphene, graphene oxide, reduced graphene oxide, graphene nanoribbons, and mixtures and combinations thereof. In some embodiments, the electrically-conductive material can exist in the form of particles, powders, rods, or any combination thereof. In some embodiments, each current collector may include a freestanding carbon material in the form of a paper, a foam, a felt, a fiber, a film, a sheet, a tape, a cloth, a disc, a string, a foil, or any combinations thereof. Each current collector can be perforated, where the pore size of the perforations can be about 500 nm or above (e.g., about 500 nm to about 5 mm, preferably about 500 nm to about 1 mm, more preferably about 500 nm to about 200 μm) and the distance between pores can be about 10 μm or more (e.g., about 10 μm to about 10 mm, preferably about 50 μm to about 10 mm, more preferably about 200 μm to about 10 mm).

Separator

Electrolytic separator 32 may be in contact with cathode 14, or separator 32 may be in contact with electrolyte 30. Where electrochemical cell 10 includes an anode, separator 32 can be disposed between cathode 14 and anode 18. Separator 32 may be larger in one or both of its width and length than one or both of cathode current collector 24 and anode current collector 26, in order to avoid contact between cathode 14 and anode 18, between cathode 14 and anode current collector 26, between cathode current collector 24 and anode 18, or between cathode current collector 24 and anode current collector 26.

Separator 32 can include an electrolyte to provide for ion transport within electrochemical cell 10, and to act as a conduit for ion transport through its interaction with cathode 14 and/or anode 18. Separator 32 may be in contact with electrolyte 30, and may include a polymeric material, such as for example a polymer film such as polyethylene, polypropylene, poly(tetrafluoroethylene), or poly (vinyl chloride), among others. Typically, the polymer film, when present, includes polypropylene and/or polyethylene. Alternatively, or in addition, electrolytic separator 32 can include nonwoven fibers (such as nylon, polyesters, and glass, among others), a glass, a ceramic, or any combination thereof. In some embodiments, separator 32 includes glass fibers. In some embodiments, separator 32 includes a surfactant coating or treatment to enhance the wettability of a liquid-based electrolyte.

Electrosprayed Films

Electrospraying, also known as electrospinning, typically refers to a thin film production method that uses electric force to draw out charged threads of organic solutions or organic melts.

Self-charging electrochemical cell 10 can include one or more of a cathode 14 and an electrolyte material 40 that includes an electrosprayed film. Such electrosprayed films can include a polymeric material as described above. Where the electrolyte material includes an electrosprayed film, the electrosprayed film can include more than 70 wt. %, preferably more than 80 wt. %, more preferably more than 90 wt. % of the electrolyte material described above. Similarly, when the cathode material includes an electrosprayed film, the electrosprayed film includes more than 70 wt. %, preferably more than 80 wt. %, more preferably more than 90 wt. % of the cathode active material described above.

It should be appreciated that one or more electrospraying parameters, such as flow rate, applied voltage, applied current, nozzle dimension, nozzle type, distance between the tip of the nozzle and a current collector, and the like can be adjusted in order to modify the film applied. The electrospraying process can advantageously allow for the elongation and the thinning of the (e.g., non ion- or low ion-conducting) polymeric material, which may not only strongly bind to electrolyte materials to fabricate freestanding films that are microns thick (e.g., >5 μm) without cracking, but can also cover a surface of electrolyte 30 with a relatively small amount of the polymeric material, compared to the use of more traditional application techniques. The electrospraying process permits for improved overall battery performance at least partially by maximizing a surface area of key battery materials (such as, for example, an electrode active material, or an electrolyte material) in a given volume.

EXAMPLES

Various aspects and examples of the self-charging electrochemical cells of the present disclosure are described below and illustrated in the associated drawings. Unless otherwise specified, such electrochemical cells, batteries, apparatus, and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/ or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

Example 1

Figure 3:
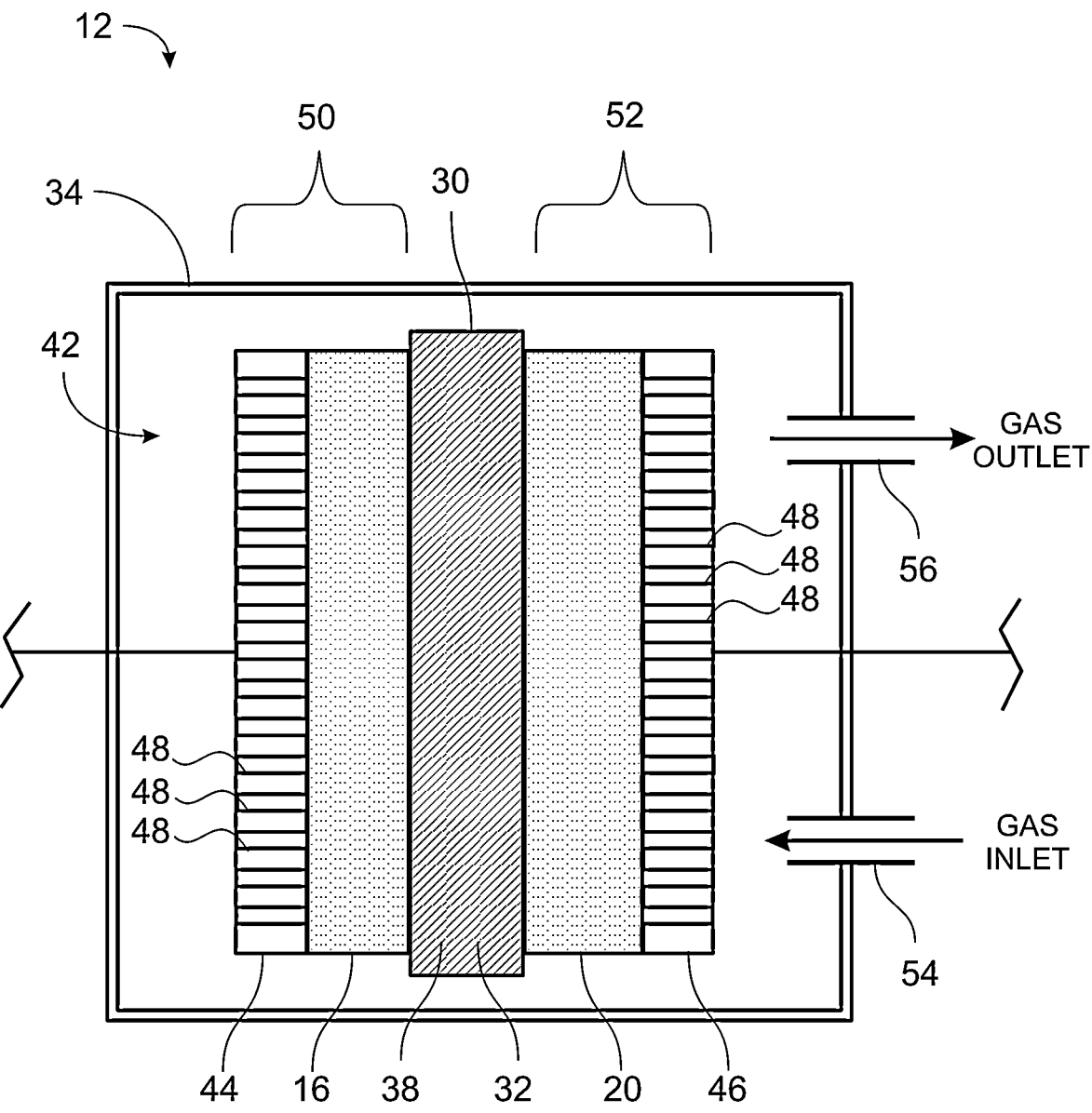
FIG. 3 is a schematic illustration of an alternative exemplary self-charging electrochemical cell of the present disclosure.

An exemplary self-charging electrochemical cell 42 according to the present disclosure is shown schematically in FIG. 3. Electrochemical cell 42 is substantially analogous to electrochemical cell 10 of FIG. 1, excepting in that both cathode current collector 44 and anode current collector 46 are perforated, that is they incorporate a plurality of openings 48 so that a non-inert, or reducible, gas, when present, can permeate electrodes 50 and 52 more easily. The selected gas, when present, can be introduced to electrochemical cell 42 via a gas inlet 54 and purged with a gas outlet 56, where gas inlet 54 and gas outlet 56 are connected to cell housing 34. In some embodiments, the gas inlet and gas outlet can be combined and placed at one location of cell housing 34. In some embodiments, the gas outlet can be removed and replaced with a pressure relief valve that automatically released gas at above a certain internal pressure within cell housing 34.

Example 2

Figure 4:
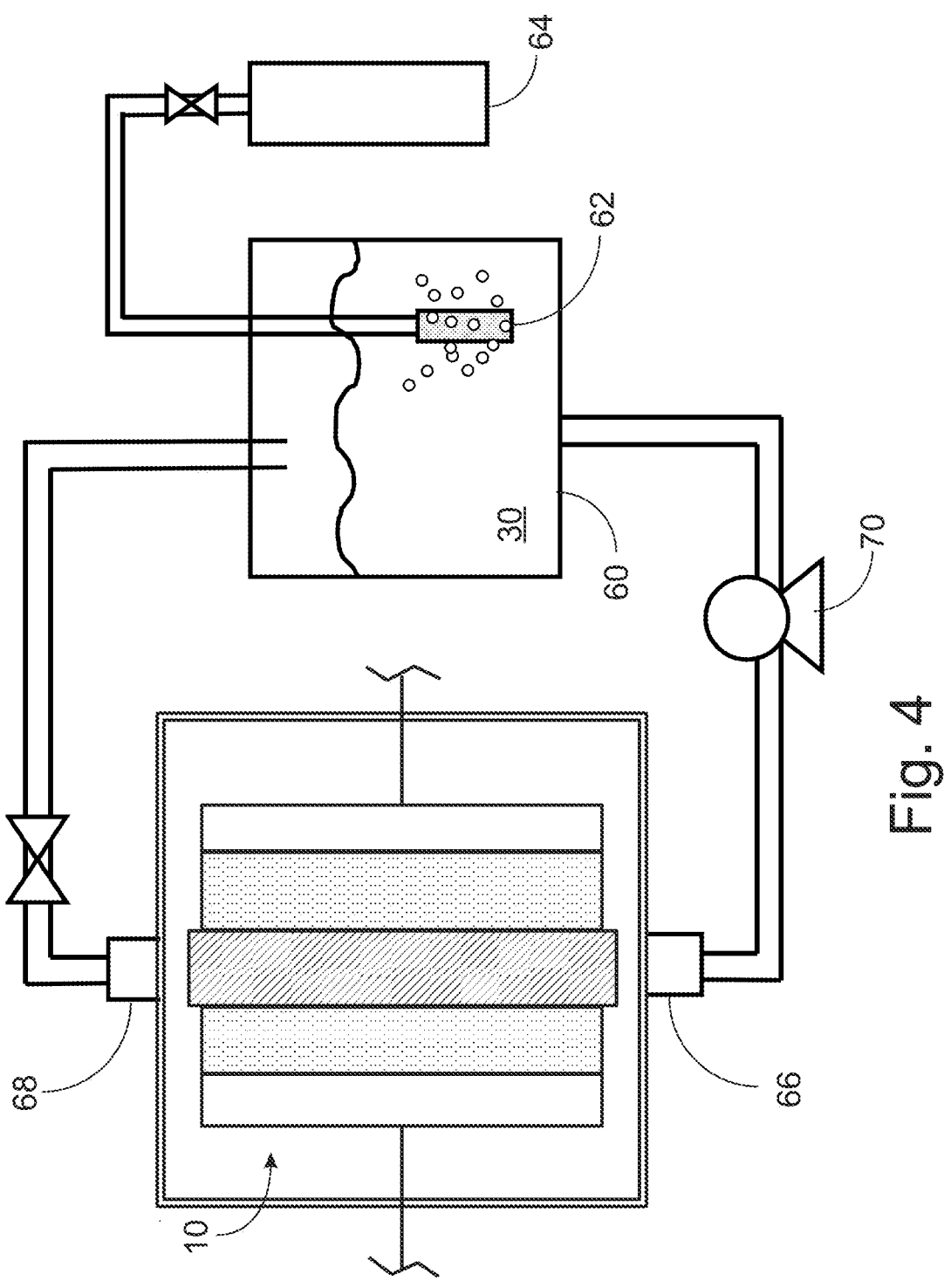
FIG. 4 is a schematic illustration of an alternative exemplary self-charging electrochemical cell of the present disclosure, including a system for adding a gas to the electrolyte.

Exemplary self-charging electrochemical cell 10 is shown schematically in FIG. 4, however the electrochemical cell is coupled to an apparatus for the addition of a non-inert or reducible gas to the cell. As shown, a desired non-inert, or reducible gas, when present, can be introduced to an electrolyte reservoir 60 outside of electrochemical cell 10 The non-inert or reducible gas can be introduced into electrolyte 30 in electrolyte reservoir 60 by, for example, sparging electrolyte 30 using an appropriate gas source, such as a fritted gas bubbler 62, for example, coupled to a gas supply 64. The gasified electrolyte can then be circulated to and from electrochemical cell 10 via electrolyte inlet 66 and electrolyte outlet 68, using a circulation pump 70. The non-inert or reducible gas is then dissolved in and diffused throughout electrolyte 30.

Example 3

A self-charging electrochemical cell according to the present disclosure was prepared using a lithium metal disc as the anode and/or the anode active material, polypropylene as the separator material, iridium and carbon black as the cathode material, oxygen as the cathode active material, and the current collector for both the cathode and the anode were 316L stainless steel.

The lithium metal discs were 99.8% purity (Honjo Metal) and had a thickness of 20 μm. It is expected that the purity of the lithium metal will decrease over time even if stored in an inert gas environment partially due to the purity of the inert gas and environment maintenance failure. All lithium metals were kept in an argon-filled glovebox, with less than 0.1 ppm of water or oxygen inside. All tests with lithium metals were done approximately 5 months after the purchase. Each lithium metal disc was coated with inorganic carbon and silver composite layer before use, so that the composite layer was in contact with the separator. The composite layer was made in an effort to avoid direct contact between the lithium metal disc and the atmosphere inside the electrochemical cell, and also to accelerate the conversion of the discharge product into the charge product.

The cathode was a disc, cut from an electrosprayed sheet, made of iridium, carbon black, and polycaprolactone.

Oxygen gas was used for the cathode active material, where the oxygen gas was introduced from a gas inlet of the cell housing and purged through the gas outlet. The electrochemical cell was purged with oxygen gas for 30 seconds, and the gas outlet valve was closed before operation of the cell. The atmosphere within the cell housing was kept at a constant pressure of 25 psi during operation.

The cathode current collector was prepared using 316L stainless steel mesh. The stainless steel had a wire diameter of 0.05 mm and an aperture of 0.08 mm. The anode current collector was prepared using 316L stainless steel foil. Both the cathode current collector and the anode current collector were discs cut from the selected materials.

The electrolyte was prepared by dissolving lithium bis (trifluoromethanesulfonyl)imide salt in 1,2-dimethoxyethane solvent. The electrochemical cell was operated at a current density of 0.1 mA/cm$^2$ normalized by the area of the lithium metal disc in all cases.

The theoretical gravimetric specific capacity of lithium metal is 3861.328 mAh/g. The volumetric density of the lithium metal was 0.534 g/cm$^3$. The areal mass of the lithium metal foil with thickness of 20 μm was 0.001068 g/cm$^2$. The calculated theoretical areal capacity of the lithium metal foil was 4.1239 mAh/cm$^2$. Assuming that the lithium content of the lithium metal foil was 99.8% and that no appreciable impurities built up during storage and handling, the maximum theoretical capacity was calculated to be 4.1156 mAh/cm$^2$. At a current density of 0.1 mA/cm$^2$, the electrochemical cells, equipped with the lithium metal foil, were discharged for 40 to 50 hours, during which at least a portion of the lithium metal foil was in contact with the electrolyte, separator and oxygen gas.

Figure 5:
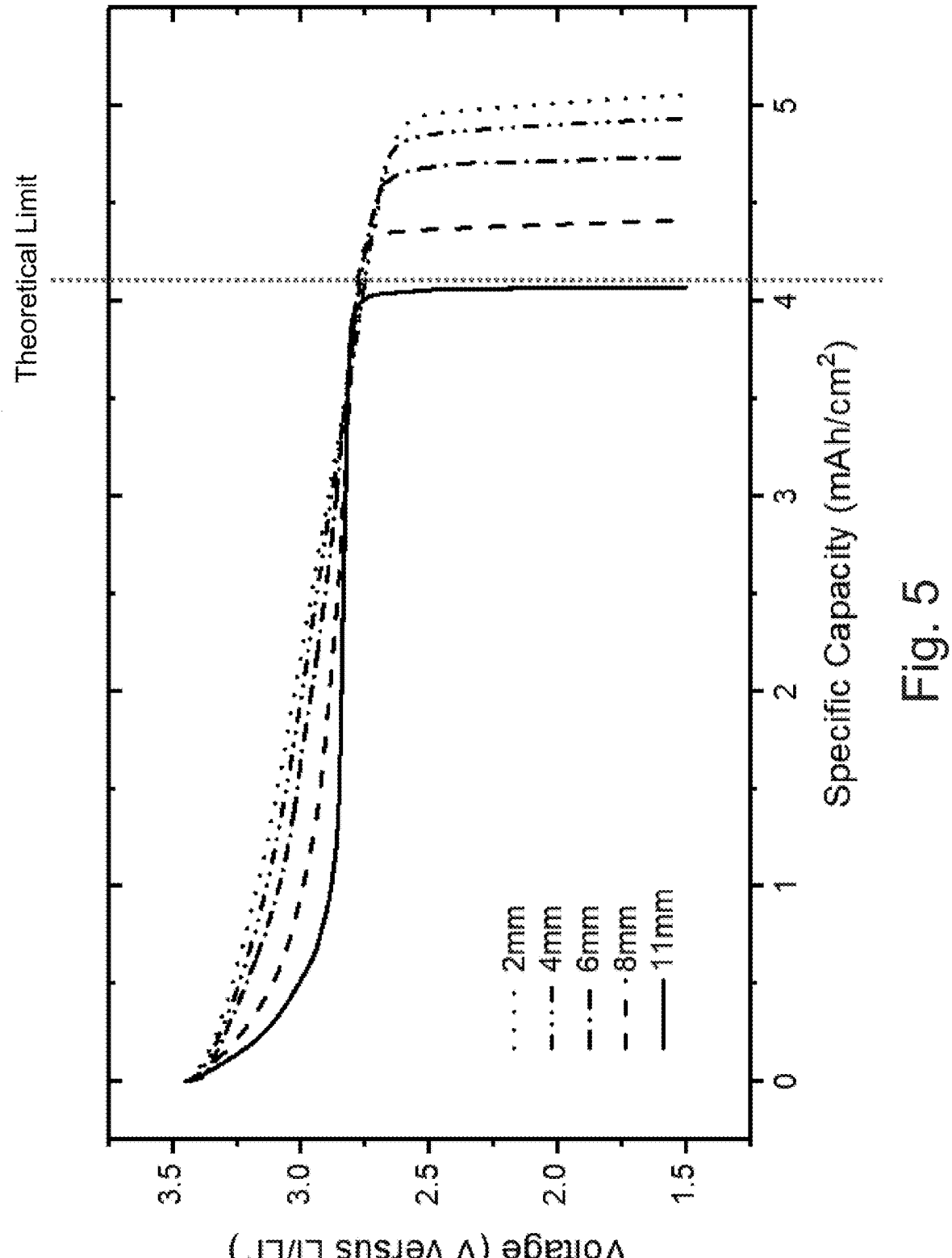
FIG. 5 is a plot showing discharge profiles of several electrochemical cells of the present disclosure.

FIG. 5 is a graph that illustrates the discharge profiles of several electrochemical cells assembled as describe above, having different sizes of anode. The electrochemical cells were tested using different sizes (2 mm, 4 mm, 6 mm, 8 mm, and 11 mm in diameter) of the lithium metal disc, with all other parameters remaining fixed. The smaller size of the lithium metal disc results in a larger area of the anode current collector being exposed to the electrolyte. The discharge specific capacity increases as the diameter of the lithium metal disc decreases. It is noteworthy that regardless of the size of the lithium metal disc, each of the electrochemical cells achieved a specific capacity equal to about or greater than the calculated theoretical capacity.

Figure 6:
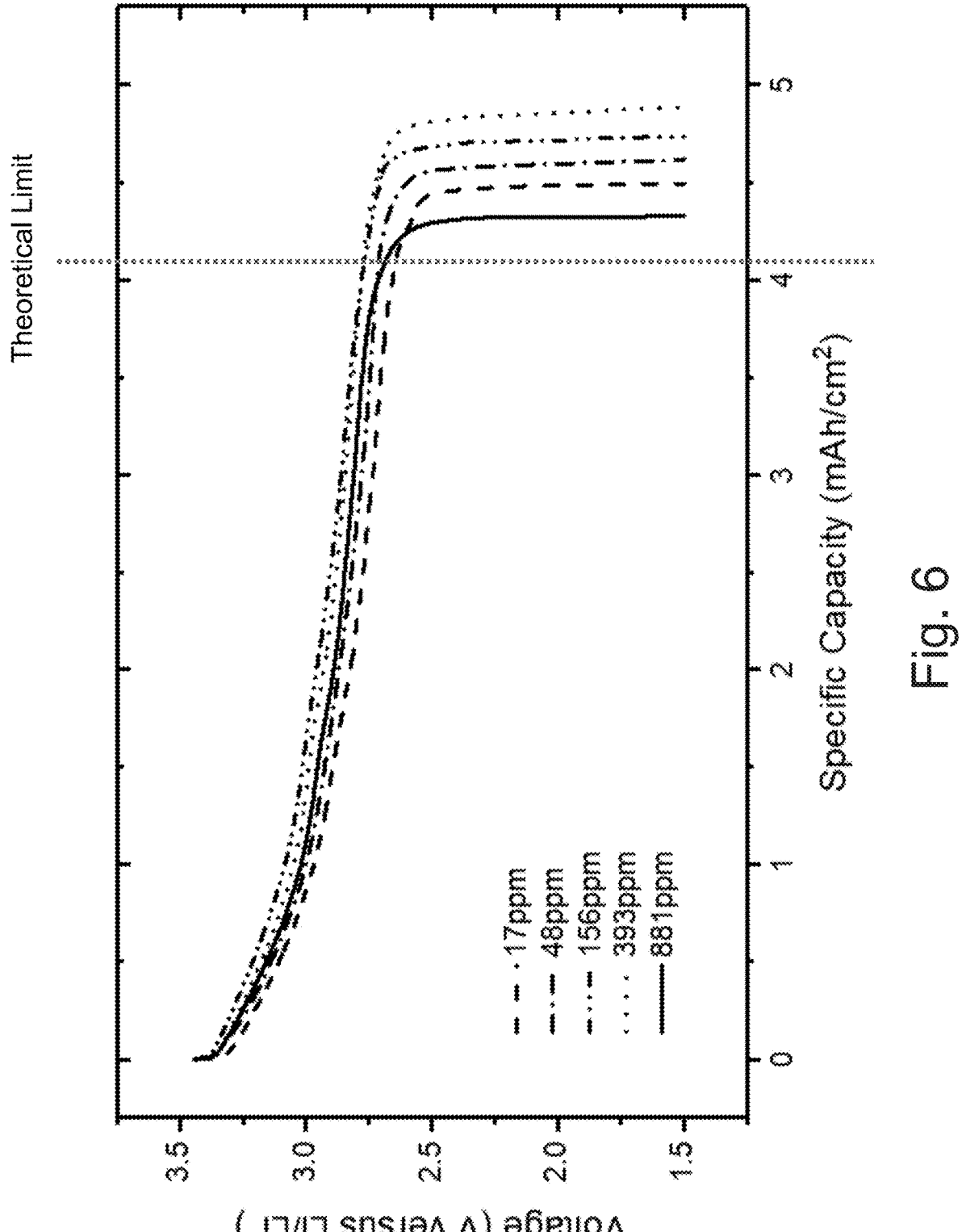
FIG. 6 is a plot showing the effect of water content on the discharge profiles of electrochemical cells of the present disclosure.

FIG. 6 is a graph that illustrates the discharge profiles of an electrochemical cell assembled as described above, with differing amounts of water (17 ppm, 48 ppm, 156 ppm, 393 ppm, and 881 ppm) present in the electrolyte. The higher amount of water in the electrolyte did not always result in a greater specific capacity, partially due to an undesirable reaction with the lithium metal disc. A water content of 393 ppm in the electrolyte demonstrated the highest specific capacity, and a water content of 881 ppm demonstrated the lowest. However, all of the measurements exceeded the corresponding calculated theoretical capacities.

For traditional and conventional lithium-ion batteries, an electrolyte water content over 50 ppm is considered very high. Where a lithium metal battery employs a lithium metal anode, it is generally recommended that the water content of the electrolyte be kept well below 10 ppm. In contrast, the electrochemical cells of the present disclosure, even with a lithium metal anode, are unique in that the water content is associated with production of a superoxide or superoxide moiety as a discharge product, where the superoxide or superoxide moiety has a higher solubility in the electrolyte than the oxygen gas or the cathode active material.

Figure 7:
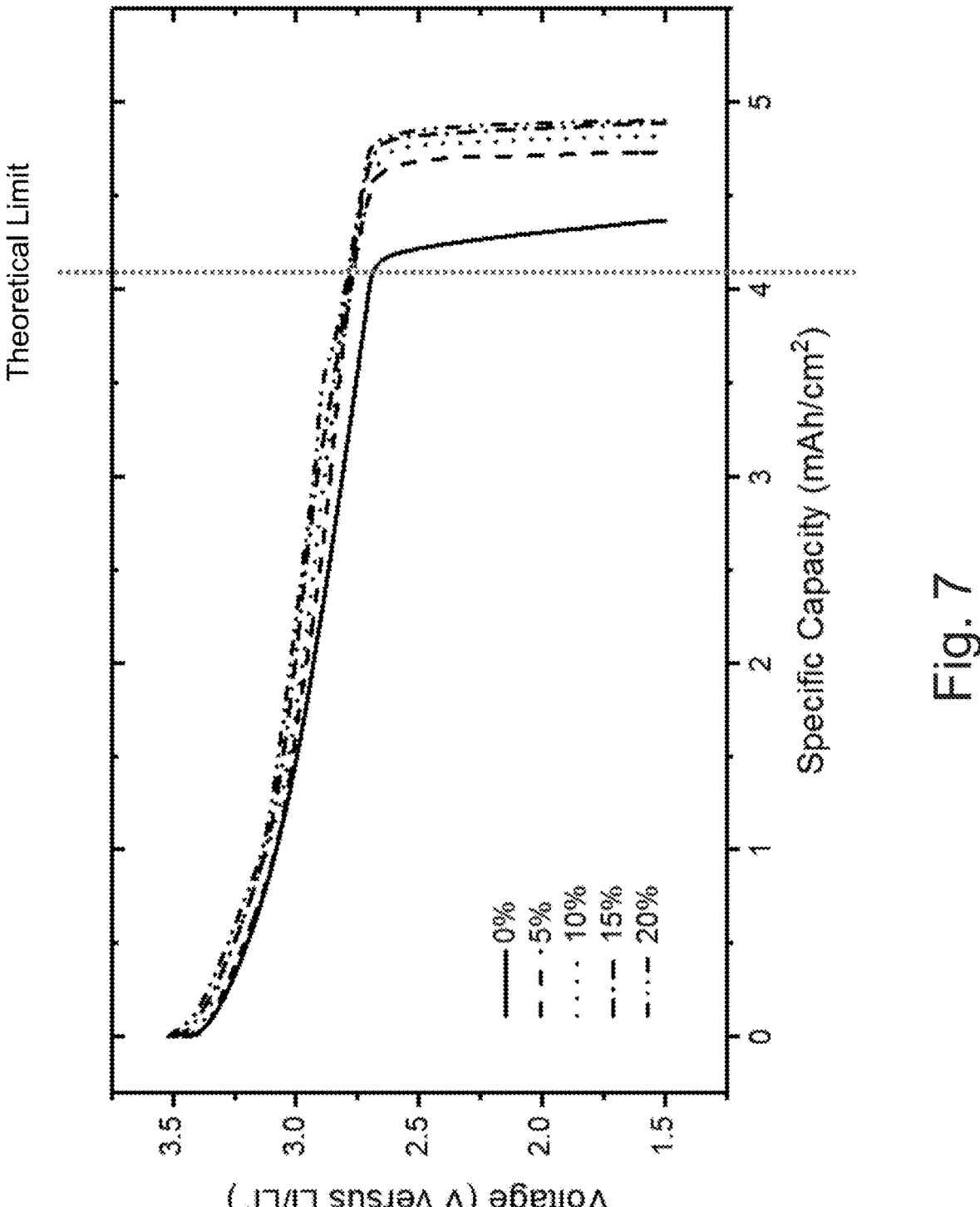
FIG. 7 is a plot showing the effect of cathode iridium concentration on the discharge profiles of electrochemical cells of the present disclosure.

FIG. 7 is a graph that illustrates the discharge profiles of an electrochemical cell assembled as described above, having different weight percentages of iridium content (0%, 5%, 10%, 15%, and 20%) in the cathode composition used. Higher weight percentages of iridium content demonstrated greater specific capacities, partially due to the production of a superoxide or superoxide moiety as a discharge product. The superoxide or superoxide moiety has a higher solubility in the electrolyte than the oxygen gas or the cathode active material. The results show the greatest increase in the specific capacity from 0% to 5% of the iridium content. The amount of increase gets smaller going from 5% to 10%, 10% to 15%, and 15% to 20%. This may be partially due to the amount of superoxide or superoxide moiety being generated during discharging not being equivalent or proportional to the amount that is converted into the charge product on the anode surface, or that the amount of superoxide or superoxide moiety generated during discharging is not entirely proportional to the amount of iridium used as an electrocatalyst and as part of the cathode material.

Figure 8:
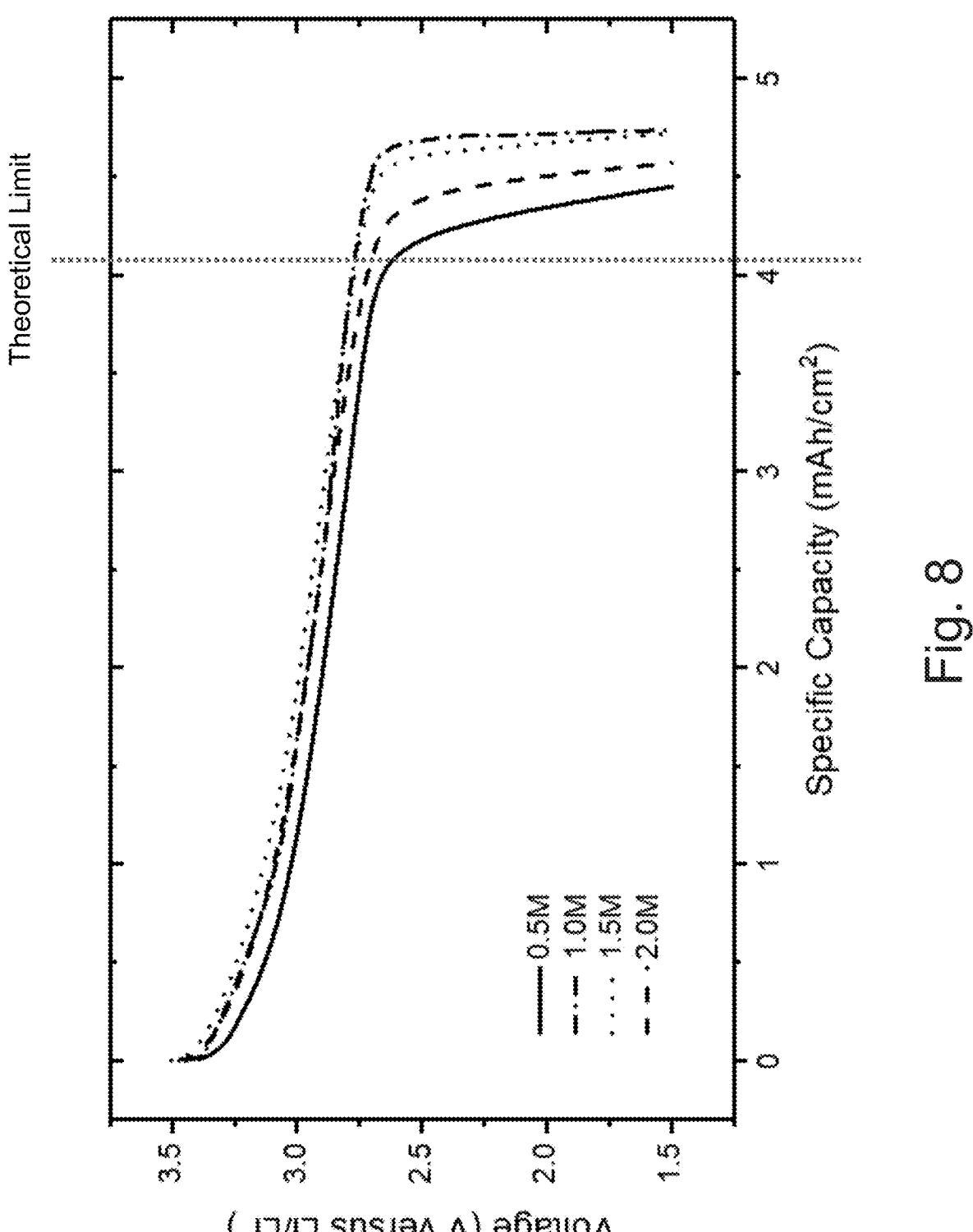
FIG. 8 is a plot showing the effect of salt concentration on the discharge profiles of electrochemical cells of the present disclosure.

FIG. 8 is a graph illustrating the discharge profiles of a self-charging electrochemical cell assembled as described above, having differing salt concentrations (0.5 M, 1.0 M, 1.5 M, and 2.0 M) dissolved in the electrolyte. The salt used was lithium bis(trifluoromethanesulfonyl)imide. Tests were performed in an effort to clarify the effect of salt concentration on the discharge specific capacity of the presently disclosed electrochemical cells, with the result showing that a 1.0 M concentration of lithium bis(trifluoromethanesulfonyl)imide in 1,2-dimethoxyethane obtained the highest discharge specific capacity, whereas a salt concentration of 0.5 M obtained the lowest. Without wishing to be bound by theory, it is believed that the increase in the amount of salt helped improved the ionic conductivity of the electrolyte, as expected from its conventional model and as shown in the profiles. However, the amount of salt concentration in the electrolyte was not shown to be clearly proportional to the discharge capacity of the electrochemical cell, which may rule out the possibility that at least a portion of the electrolyte salt may contribute to the additional specific capacity of the cell beyond its calculated theoretical limit.

Figure 9:
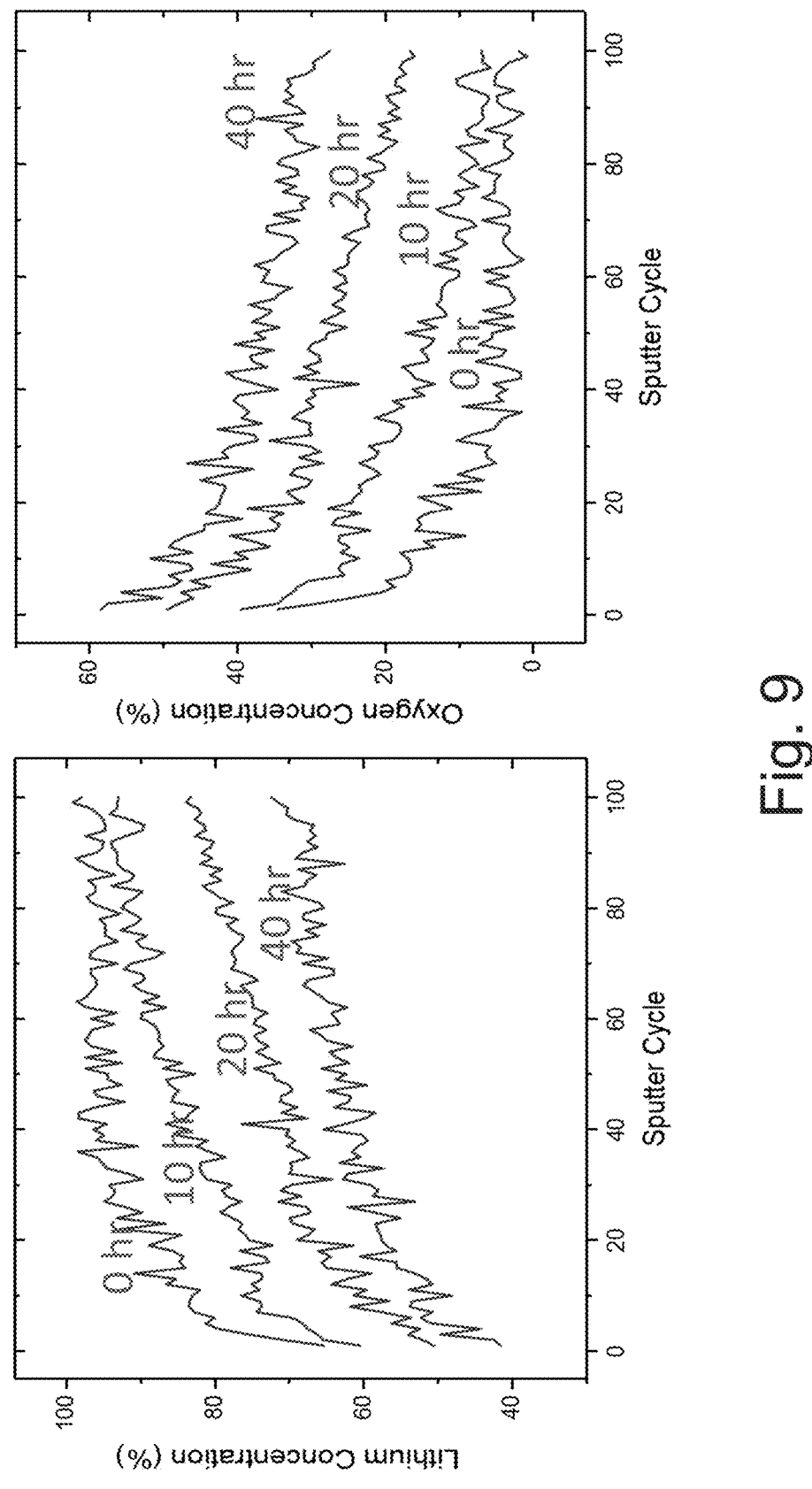
FIG. 9 is a plot showing the atomic concentration of lithium and oxygen in lithium metal foils after exposure to oxygen.

FIG. 9 is a graph that illustrates the atomic concentration of lithium and oxygen in lithium metal foils after varying amounts of exposure to an oxygen gas atmosphere (0 hr, 10 hr, 20 hr, 40 hr) from the very top surface of the foil. The atomic concentration measurements were made using X-ray photoelectron spectroscopy depth profiling analysis. An argon sputtering method was selected to etch away the surface nanometer-by-nanometer, within a 1 μm-by-1 μm area, at an operating voltage of 4.5 kV and an emission current of 10 mA, for 30 seconds each cycle. Each sputtering cycle was equivalent to about 1 nm in depth. The lithium concentration of the lithium metal foil with 0 hr of oxygen exposure starts at about 65% and ends at about 98% at the $100^{th}$ sputtering cycle, whereas the sample with 40 hr of oxygen exposure starts at about 41% lithium concentration and ends at about 72% lithium concentration. As each discharge of the electrochemical cell required approximately 40 to 50 hours at a current density of 0.1 mA/cm$^2$, it should be appreciated that even if the glovebox environment had been in ideal condition for storing lithium metal, and provided that there was no defect in the manufacturing, packaging, or delivery process of the lithium metal, the overall unoxidized lithium content in the lithium metal foil that could contribute to the discharge capacity of the resulting cell may be less than about 99.8% during operation of the electrochemical cell. The result indicates that the actual theoretical capacity may therefore be much smaller than 4.1156 mAh/cm$^2$.

Example 4

This section describes additional aspects and features of the disclosed electrochemical cells, batteries, and methods presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A self-charging electrochemical cell including a cathode comprising a cathode active material, wherein the cathode active material transforms into a discharge product during or after discharge of the electrochemical cell, an electrolyte comprising a solvent and a salt, wherein the salt is dissolved in the solvent, where the electrolyte is in contact with the cathode, and where the solubility of the cathode active material in the electrolyte is less than the solubility of the discharge product in the electrolyte.

A2. The electrochemical cell of paragraph A1, further including an anode that includes an anode active material.

A3. The electrochemical cell of paragraph A2, further including an anode current collector including a metal or an alloy including one or more of molybdenum, titanium, and zirconium.

A4. The electrochemical cell of paragraph A1, further including a cathode current collector including a metal or an alloy including one or more of molybdenum, titanium, and zirconium.

A5. The electrochemical cell of paragraph A1, further including a separator.

A6. The electrochemical cell of paragraph A1, where the cathode active material is a non-inert gas.

A7. The electrochemical cell of paragraph A1, where the discharge product is a redox shuttle during discharging.

A8. The electrochemical cell of paragraph A1, where the discharge product is RxOy, where R is an atom, a molecule, or a radical.

A9. The electrochemical cell of paragraph A1, where the discharge specific capacity of the electrochemical cell normalized by the cathode active material is larger than the theoretical discharge specific capacity normalized by the cathode active material.

A10. The electrochemical cell of paragraph A2, where the discharge specific capacity of the electrochemical cell normalized by the anode active material is larger than the theoretical discharge specific capacity normalized by the anode active material.

A11. The electrochemical cell of paragraph A2, wherein the total number of electrons that the anode active material of the electrochemical cell can store is less than the total number of electrons that the cathode active material of the electrochemical cell can store.

A12. The electrochemical cell of paragraph A1, where the solubility of the cathode active material in the electrolyte is less than 1.0 molar concentration at room temperature.

A13. The electrochemical cell of paragraph A1, where the solubility ratio of the cathode active material to the discharge product is less than 0.5.

A14. The electrochemical cell of paragraph A1, where the molecular weight of the solvent is less than or equal to 200 g/mol.

A15. The electrochemical cell of paragraph A2, where the anode active material or the discharge product is a metal or a metal complex (alloy, compound, etc.).

A16. The electrochemical cell of paragraph A2, where the anode active material (at least a portion) includes a surface coating layer, wherein the surface coating layer is electrically conductive. ($>10^3$ S/cm).

A17. The electrochemical cell of paragraph A1, where the cathode further comprises one or more of the platinum group elements (ruthenium (Ru), rhodium (Rh), palladium (Pd), osmium (Os), iridium (Ir), and platinum (Pt)).

A18. The electrochemical cell of paragraph A2, where the cathode or anode further comprises an electrically-conductive material.

A19. The electrochemical cell of paragraph A18, where the electrically-conductive material includes a porous carbon material that includes one or more of carbon black, carbon nanotubes, carbon nanofibers, carbon dots, activated carbon, graphite, graphene, graphene oxide, reduced graphene oxide, and graphene nanoribbons.

A20. The electrochemical cell of paragraph A19, where the porous carbon material is doped with one or more heteroatoms selected from boron, oxygen, nitrogen, sulfur, phosphorous, fluorine, chlorine, and bromine.

A21. The electrochemical cell of paragraph A18 where the cathode or anode further comprises one or more of a polymeric binder, a plasticizer, and a carboxylic acid.

Conclusion

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electrochemical cell, comprising:
   a cathode, the cathode including a total amount of a cathode active material that can store a total number of cathodic electrons;
   an anode, the anode including a total amount of an anode active material that can store a total number of anodic electrons;

an electrolyte, the electrolyte including a solvent and a salt dissolved in the solvent; the electrolyte being in contact with the cathode;
   wherein the cathode active material is transformed into a discharge product during or after a discharge of the electrochemical cell;
   a solubility of the cathode active material in the electrolyte is less than a solubility of the discharge product in the electrolyte;
   the soluble discharge product acts as a redox shuttle during discharge of the electrochemical cell by transporting electrons from the cathode to the anode; and
   wherein the cathode, the anode, and the electrolyte are enclosed within a sealed and gas-impermeant cell housing.

2. The electrochemical cell of claim 1, further comprises a cathode current collector associated with the cathode, the cathode current collector including a metal or a metal alloy that includes one or more of molybdenum, titanium, and zirconium.

3. The electrochemical cell of claim 1, further comprising an anode current collector associated with the anode, the anode current collector including a metal or a metal alloy that includes one or more of molybdenum, titanium, and zirconium.

4. The electrochemical cell of claim 1, further comprising a separator.

5. The electrochemical cell of claim 1, wherein the cathode active material includes a reducible gas.

6. The electrochemical cell of claim 1, wherein the discharge product includes a reducing agent, the reducing agent selected so that an oxidation product of the reducing agent is a gas.

7. The electrochemical cell of claim 1, wherein the discharge product includes one or more reactive species capable of independent existence, each reactive species having one or more unpaired electrons.

8. The electrochemical cell of claim 1, wherein the discharge product includes a polar material including two elements, wherein a difference in electronegativity between the two elements is greater than or equal to 0.5.

9. The electrochemical cell of claim 1, wherein an actual measured discharge specific capacity of the electrochemical cell is larger than a calculated discharge specific capacity for the electrochemical cell, provided that the calculated discharge specific capacity is based on the total number of cathodic electrons.

10. The electrochemical cell of claim 1, wherein an actual measured discharge specific capacity of the electrochemical cell is larger than a calculated discharge specific capacity for the electrochemical cell, provided that the calculated discharge specific capacity is based upon the total number of anodic electrons.

11. The electrochemical cell of claim 1, wherein the total number of anodic electrons is less than the total number of cathodic electrons.

12. The electrochemical cell of claim 1, wherein the solubility of the cathode active material in the electrolyte is less than 1.0 mole/liter at room temperature.

13. The electrochemical cell of claim 1, wherein a ratio of the solubility of the cathode active material in the electrolyte to the solubility of the discharge product in the electrolyte is less than 0.5.

14. The electrochemical cell of claim 1, wherein the solvent has a molecular weight that is less than or equal to 200 g/mol.

15. The electrochemical cell of claim 1, wherein one or both of the anode active material and the discharge product is a metal, a metal alloy, or a metal complex.

16. The electrochemical cell of claim 1, wherein at least a portion of the anode active material includes a surface coating layer that is electrically conductive.

17. The electrochemical cell of claim 1, wherein the cathode includes one or more of ruthenium, rhodium, palladium, osmium, iridium, and platinum.

18. The electrochemical cell of claim 1, wherein one or more of the cathode and the anode further comprises an electrically-conductive material that is a porous carbon material selected from carbon black, carbon nanotubes, carbon nanofibers, carbon dots, activated carbon, graphite, graphene, graphene oxide, reduced graphene oxide, and graphene nanoribbons.

19. The electrochemical cell of claim 18, wherein the porous carbon material is doped with one or more heteroatoms selected from boron, oxygen, nitrogen, sulfur, phosphorous, fluorine, chlorine, and bromine.

20. The electrochemical cell of claim 1, wherein one or both of the cathode and the anode includes one or more of a polymeric binder, a plasticizer, and a carboxylic acid.

\* \* \* \* \*